US012580709B2

(12) United States Patent
Huang et al.

(10) Patent No.: US 12,580,709 B2
(45) Date of Patent: Mar. 17, 2026

(54) UPLINK PHASE TRACKING REFERENCE SIGNALS FOR MULTIPLE TRANSMITTERS ON UPLINK SHARED CHANNELS

(71) Applicant: QUALCOMM Incorporated, San Diego, CA (US)

(72) Inventors: Yi Huang, San Diego, CA (US); Muhammad Sayed Khairy Abdelghaffar, San Jose, CA (US); Yu Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 364 days.

(21) Appl. No.: 17/886,978

(22) Filed: Aug. 12, 2022

(65) Prior Publication Data

US 2024/0056254 A1     Feb. 15, 2024

(51) Int. Cl.
*H04L 5/00*          (2006.01)
(52) U.S. Cl.
CPC .......... *H04L 5/0051* (2013.01); *H04L 5/0058* (2013.01)
(58) Field of Classification Search
CPC ... H04L 5/0051; H04L 5/0058; H04L 5/0023; H04L 5/0048
See application file for complete search history.

(56) References Cited

U.S. PATENT DOCUMENTS

2021/0075570 A1*   3/2021   Xi ......................... H04L 5/0051
2022/0361201 A1*  11/2022   Yoshioka ................. H04L 1/08
2024/0057140 A1*   2/2024   Sun ....................... H04L 5/0051
2024/0080156 A1*   3/2024   Gao ....................... H04L 5/0035

OTHER PUBLICATIONS

ETSI TS 138.211 V16.4.0 "5G; Physical channels and modulation" (Year: 2021).*

* cited by examiner

*Primary Examiner* — Jung H Park
(74) *Attorney, Agent, or Firm* — Holland & Hart LLP

(57)          ABSTRACT

Methods, systems, and devices for wireless communications are described. The described techniques provide for phase tracking reference signal (PTRS) antenna port configuration and use to support a number of transmission layers (e.g., up to eight transmission layers). In some examples, a user equipment (UE) may be able to support up to four PTRS antenna ports. The UE may transmit capability signaling indicating a number of supported PTRS antenna ports (e.g., up to 4). The network entity may transmit control signaling indicating a number of PTRS antenna ports and a mapping between the PTRS antenna ports and other ports (e.g., sounding reference signal (SRS) ports or demodulation reference signal (DMRS) ports). In some examples, the UE may also indicate a requested number of PTRS antenna ports (e.g., which may be the same as or less than the supported number of PTRS antenna ports).

24 Claims, 20 Drawing Sheets

SRS Resource Set 305

SRS resource 310-a (SRS Port 0/PTRS port 0)

SRS resource 310-b (SRS Port 1/PTRS Port 0)

SRS resource 310-c (SRS Port 2/PTRS Port 1)

SRS resource 310-d (SRS Port 3/PTRS Port 1)

SRS resource 310-e (SRS Port 4/PTRS Port 2)

SRS resource 310-f (SRS Port 5/PTRS Port 2)

SRS resource 310-g (SRS Port 6/PTRS Port 3)

SRS resource 310-h (SRS Port 7/PTRS Port 3)

300

115-c 105-c

Control Signaling

605

610

Select PTRS Offset Value

615

PTRSs

600

1110          1120          1115

1105

1100

130     105     115

Network
Entity

Transceiver

1410

Antenna

1415

Communications
Manager

1420

Memory

Code

1430

1425

1440

Processor

1435

1405

1400

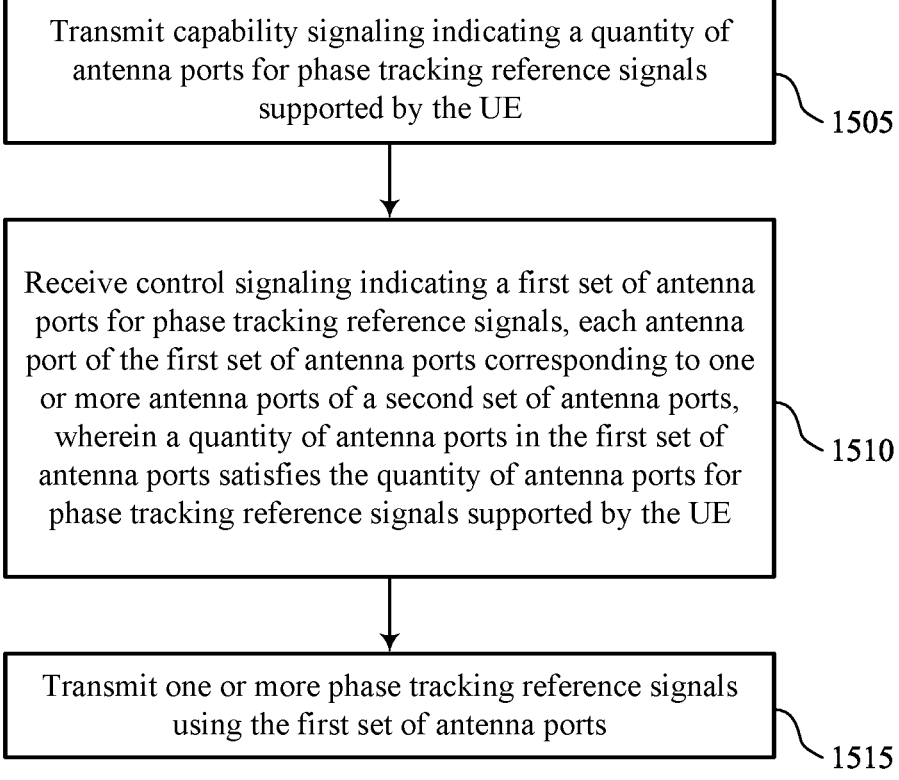

Transmit capability signaling indicating a quantity of antenna ports for phase tracking reference signals supported by the UE

1505

Receive control signaling indicating a first set of antenna ports for phase tracking reference signals, each antenna port of the first set of antenna ports corresponding to one or more antenna ports of a second set of antenna ports, wherein a quantity of antenna ports in the first set of antenna ports satisfies the quantity of antenna ports for phase tracking reference signals supported by the UE

1510

Transmit one or more phase tracking reference signals using the first set of antenna ports

Figure 17:
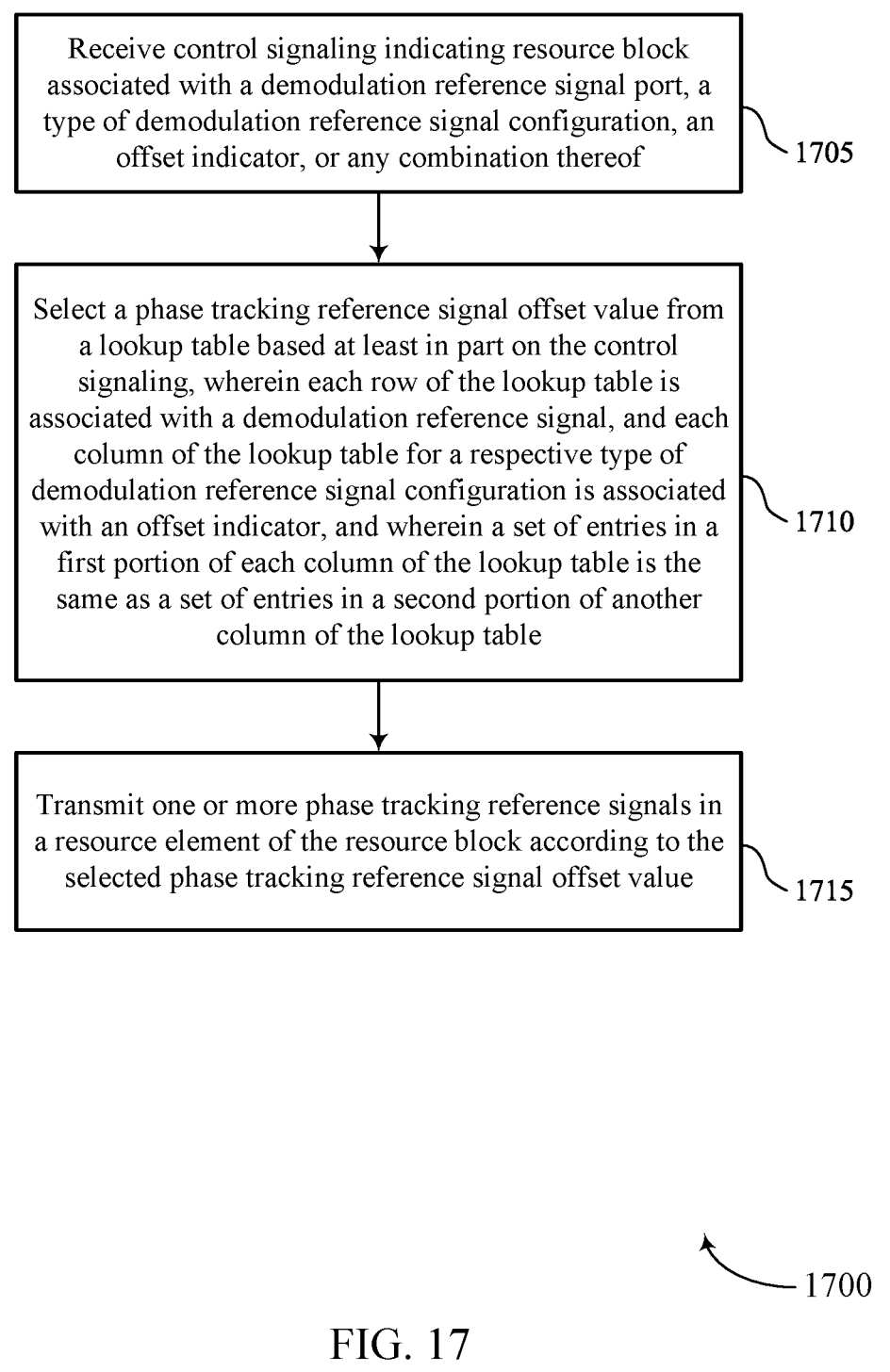

Receive control signaling indicating resource block associated with a demodulation reference signal port, a type of demodulation reference signal configuration, an offset indicator, or any combination thereof

1705

Select a phase tracking reference signal offset value from a lookup table based at least in part on the control signaling, wherein each row of the lookup table is associated with a demodulation reference signal, and each column of the lookup table for a respective type of demodulation reference signal configuration is associated with an offset indicator, and wherein a set of entries in a first portion of each column of the lookup table is the same as a set of entries in a second portion of another column of the lookup table

1710

Transmit one or more phase tracking reference signals in a resource element of the resource block according to the selected phase tracking reference signal offset value

Figure 18:
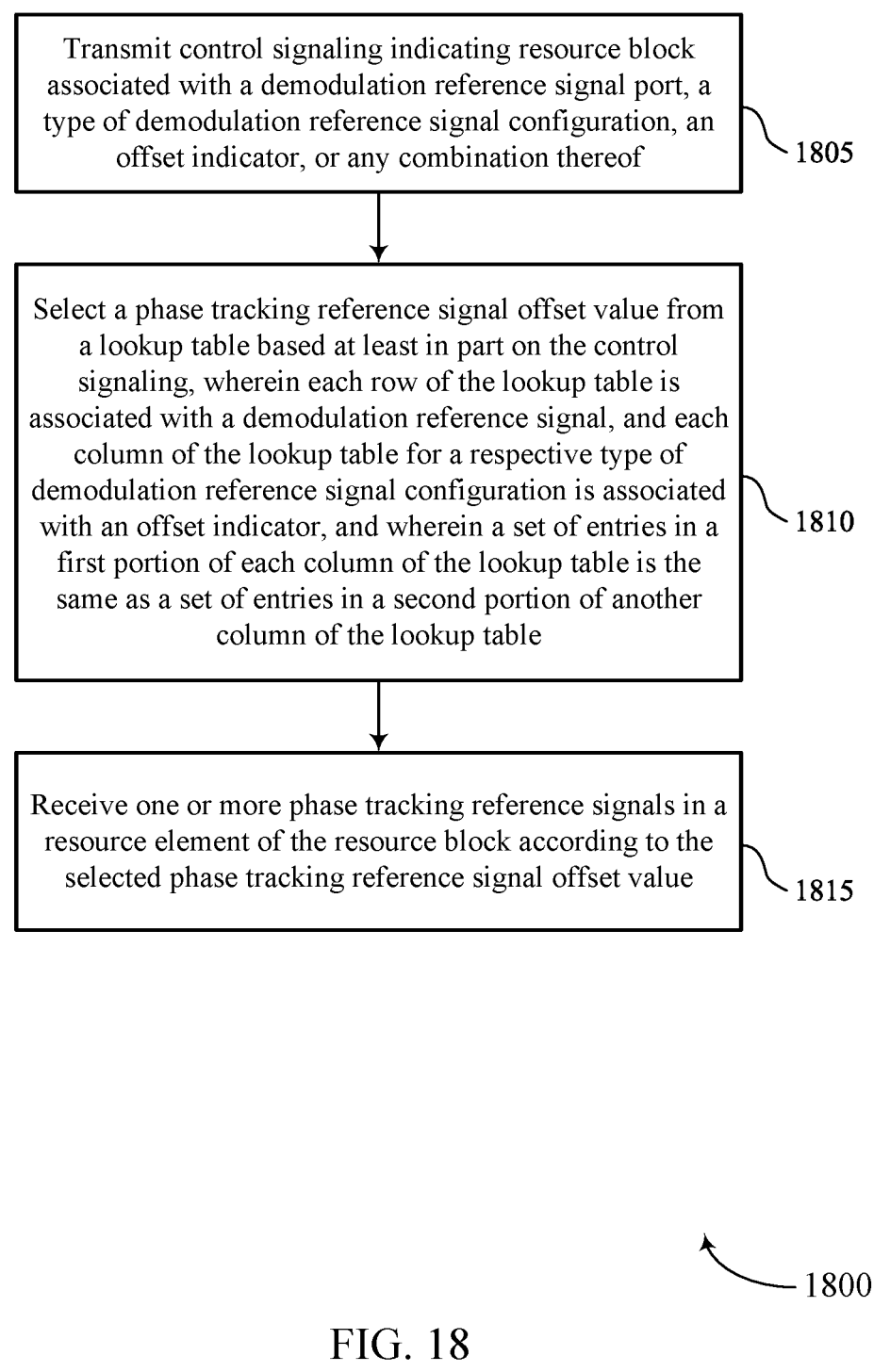

Transmit control signaling indicating resource block associated with a demodulation reference signal port, a type of demodulation reference signal configuration, an offset indicator, or any combination thereof — 1805

Select a phase tracking reference signal offset value from a lookup table based at least in part on the control signaling, wherein each row of the lookup table is associated with a demodulation reference signal, and each column of the lookup table for a respective type of demodulation reference signal configuration is associated with an offset indicator, and wherein a set of entries in a first portion of each column of the lookup table is the same as a set of entries in a second portion of another column of the lookup table — 1810

Receive one or more phase tracking reference signals in a resource element of the resource block according to the selected phase tracking reference signal offset value — 1815

Figure 19:
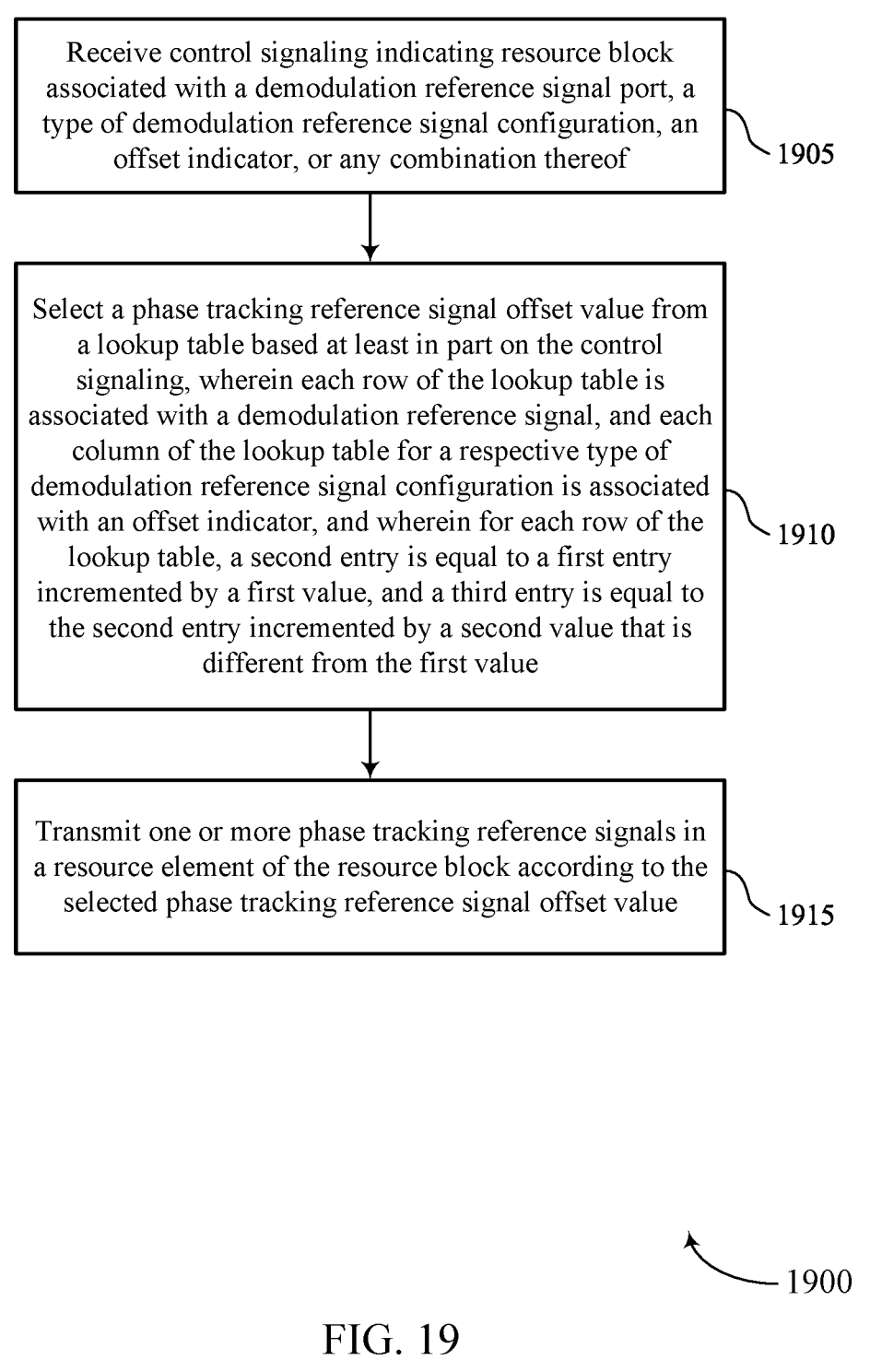

Receive control signaling indicating resource block associated with a demodulation reference signal port, a type of demodulation reference signal configuration, an offset indicator, or any combination thereof

1905

Select a phase tracking reference signal offset value from a lookup table based at least in part on the control signaling, wherein each row of the lookup table is associated with a demodulation reference signal, and each column of the lookup table for a respective type of demodulation reference signal configuration is associated with an offset indicator, and wherein for each row of the lookup table, a second entry is equal to a first entry incremented by a first value, and a third entry is equal to the second entry incremented by a second value that is different from the first value

1910

Transmit one or more phase tracking reference signals in a resource element of the resource block according to the selected phase tracking reference signal offset value

Figure 20:
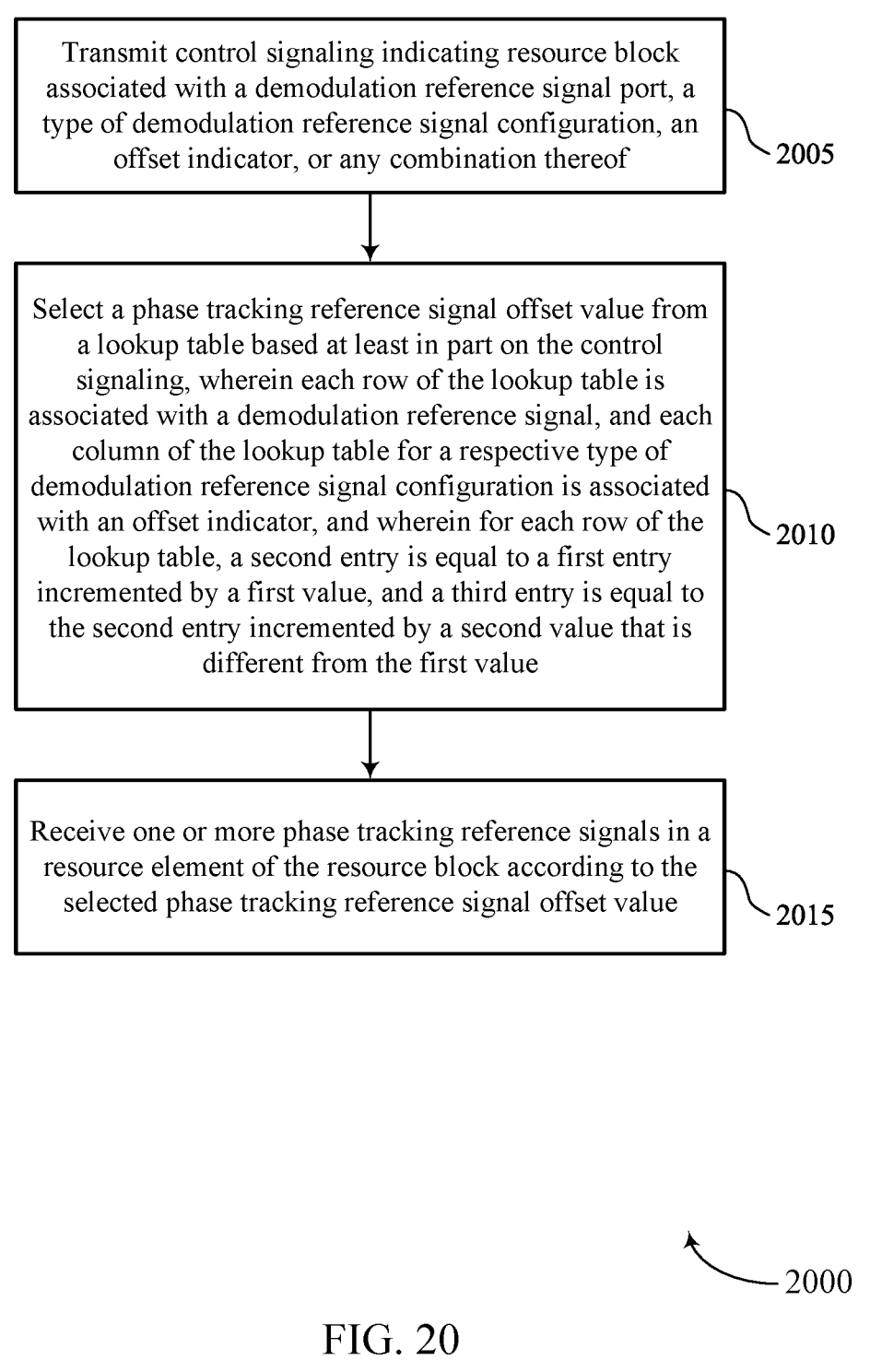

Transmit control signaling indicating resource block associated with a demodulation reference signal port, a type of demodulation reference signal configuration, an offset indicator, or any combination thereof

2005

Select a phase tracking reference signal offset value from a lookup table based at least in part on the control signaling, wherein each row of the lookup table is associated with a demodulation reference signal, and each column of the lookup table for a respective type of demodulation reference signal configuration is associated with an offset indicator, and wherein for each row of the lookup table, a second entry is equal to a first entry incremented by a first value, and a third entry is equal to the second entry incremented by a second value that is different from the first value

2010

Receive one or more phase tracking reference signals in a resource element of the resource block according to the selected phase tracking reference signal offset value

UPLINK PHASE TRACKING REFERENCE SIGNALS FOR MULTIPLE TRANSMITTERS ON UPLINK SHARED CHANNELS

FIELD OF TECHNOLOGY

The following relates to wireless communications, including uplink phase tracking reference signals (PTRSs) for multiple transmitters on uplink shared channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink phase tracking reference signals (PTRSs) for multiple transmitters on uplink shared channels. For example, the described techniques provide for PTRS antenna port configuration and use to support a number of transmission layers (e.g., up to eight transmission layers). In some examples, a user equipment (UE) may be able to support up to four PTRS antenna ports (e.g., instead of up to two PTRS antenna ports). The UE may transmit capability signaling indicating a number of supported PTRS antenna ports (e.g., up to 4). The network entity may transmit control signaling indicating a number of PTRS antenna ports and a mapping between the PTRS antenna ports and other ports (e.g., sounding reference signal (SRS) ports or demodulation reference signal (DMRS) ports). For non-codebook based physical uplink shared channel (PUSCH) transmissions, the network may configure (e.g., via radio resource control (RRC) signaling) up to 8 SRS resources and a mapping between the SRS resources and up to four PTRS antenna ports. For codebook based PUSCH transmission, the network may configure (e.g., via downlink control information (DCI) signaling) a mapping between up to four PTRS antenna ports and up to 8 DMRS antenna ports (e.g., or SRS antenna ports). In some examples, the UE may also indicate a requested number of PTRS antenna ports (e.g., which may be the same as or less than the supported number of PTRS antenna ports).

A method for wireless communications at a user equipment (UE) is described. The method may include transmitting capability signaling indicating a quantity of antenna ports for PTRSs supported by the UE, receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and transmitting one or more PTRSs using the first set of antenna ports.

An apparatus for wireless communications at a UE is described. The apparatus may include a processor, memory coupled with the processor, and instructions stored in the memory. The instructions may be executable by the processor to cause the apparatus to transmit capability signaling indicating a quantity of antenna ports for PTRSs supported by the UE, receive control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and transmit one or more PTRSs using the first set of antenna ports.

Another apparatus for wireless communications at a UE is described. The apparatus may include means for transmitting capability signaling indicating a quantity of antenna ports for PTRSs supported by the UE, means for receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and means for transmitting one or more PTRSs using the first set of antenna ports.

A non-transitory computer-readable medium storing code for wireless communications at a UE is described. The code may include instructions executable by a processor to transmit capability signaling indicating a quantity of antenna ports for PTRSs supported by the UE, receive control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and transmit one or more PTRSs using the first set of antenna ports.

In some examples of the method, apparatuses, and non-transitory computer-readable medium described herein, receiving the control signaling may include operations, features, means, or instructions for receiving RRC signaling indicating a set of multiple SRS resources, each SRS resource of the set of multiple SRS resources associated with one of the first set of antenna ports and one of the second set of antenna ports, where the second set of antenna ports includes a set of multiple SRS ports.

Some examples of the method, apparatuses, and non-transitory computer-readable medium described herein may further include operations, features, means, or instructions for mapping a first antenna port of the first set of antenna ports to a first SRS resource associated with a first antenna port of the second set of antenna ports and to a second SRS resource associated with the first antenna port of the second set of antenna ports according to the RRC signaling, where transmitting the one or more PTRSs may be based on the mapping.

In some examples of the method, apparatuses, and non-transitory computer-readable medium described herein, the quantity of antenna ports for PTRSs supported by the UE includes eight antenna ports, and a quantity of the set of multiple SRS resources includes eight SRS resources.

In some examples of the method, apparatuses, and non-transitory computer-readable medium described herein, the PTRSs may be associated with non-codebook based transmissions on a physical uplink shared channel.

In some examples of the method, apparatuses, and non-transitory computer-readable medium described herein, receiving the control signaling may include operations, features, means, or instructions for receiving a DCI message indicating that each antenna port of the first set of antenna ports may be associated with two or more antenna ports of the second set of antenna ports according to a first ratio of a set of candidate ratios, where the second set of antenna ports includes a set of multiple DMRS antenna ports.

Some examples of the method, apparatuses, and non-transitory computer-readable medium described herein may further include operations, features, means, or instructions for mapping each antenna port of the first set of antenna ports to the two or more antenna ports of the second set of antenna ports according to a four-bit field in the DCI message.

In some examples of the method, apparatuses, and non-transitory computer-readable medium described herein, each antenna port of the first set of antenna ports may be associated with two antenna ports of the second set of antenna ports, four antenna ports of the second set of antenna ports, or eight antenna ports of the second set of antenna ports, according to the first ratio.

Some examples of the method, apparatuses, and non-transitory computer-readable medium described herein may further include operations, features, means, or instructions for mapping each antenna port of the first set of antenna ports to the two or more antenna ports of the second set of antenna ports according to a four-bit field in the DCI message, where a first bit of the four-bit field indicates an association between a first antenna port of the first set of antenna ports and a first quantity of the second set of antenna ports, and a second bit of the four-bit field indicates an association between a second antenna port of the first set of antenna ports and a second quantity of the second set of antenna ports that may be different from the first quantity of the second set of antenna ports.

In some examples of the method, apparatuses, and non-transitory computer-readable medium described herein, the PTRSs may be associated with non-codebook based transmissions on a physical uplink shared channel.

Some examples of the method, apparatuses, and non-transitory computer-readable medium described herein may further include operations, features, means, or instructions for transmitting signaling indicating the quantity of antenna ports in the first set of antenna ports, the quantity of antenna ports in the first set of antenna ports being less than or equal to the quantity of antenna ports for PTRSs supported by the UE, where receiving the control signaling may be based on transmitting the signaling indicating the quantity of antenna ports in the first set of antenna ports.

Some examples of the method, apparatuses, and non-transitory computer-readable medium described herein may further include operations, features, means, or instructions for transmitting signaling indicating a mapping between each antenna port of the quantity of antenna ports in the first set of antenna ports and the one or more antenna ports of the second set of antenna ports, where receiving the control signaling may be based on transmitting the signaling indicating the mapping, and where each antenna port of the first set of antenna ports corresponds to the one or more antenna ports of the second set of antenna ports according to the indicated mapping.

Some examples of the method, apparatuses, and non-transitory computer-readable medium described herein may further include operations, features, means, or instructions for selecting a time density value for phase tracking reference signaling from a set of multiple time density values associated with a modulation and coding scheme based on the quantity of antenna ports in the first set of antenna ports satisfying a threshold, where transmitting the PTRSs may be based on the selecting.

Some examples of the method, apparatuses, and non-transitory computer-readable medium described herein may further include operations, features, means, or instructions for selecting a frequency density value for phase tracking reference signaling from a set of multiple frequency density values associated with a modulation and coding scheme based on the quantity of antenna ports in the first set of antenna ports satisfying a threshold, where transmitting the PTRSs may be based on the selecting.

A method for wireless communications at a network entity is described. The method may include receiving capability signaling indicating a quantity of antenna ports for PTRSs supported by a UE, transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and receiving one or more PTRSs using the first set of antenna ports.

An apparatus for wireless communications at a network entity is described. The apparatus may include a processor, memory coupled with the processor, and instructions stored in the memory. The instructions may be executable by the processor to cause the apparatus to receive capability signaling indicating a quantity of antenna ports for PTRSs supported by a UE, transmit control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and receive one or more PTRSs using the first set of antenna ports.

Another apparatus for wireless communications at a network entity is described. The apparatus may include means for receiving capability signaling indicating a quantity of antenna ports for PTRSs supported by a UE, means for transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and means for receiving one or more PTRSs using the first set of antenna ports.

A non-transitory computer-readable medium storing code for wireless communications at a network entity is described. The code may include instructions executable by a processor to receive capability signaling indicating a quantity of antenna ports for PTRSs supported by a UE, transmit control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE, and receive one or more PTRSs using the first set of antenna ports.

In some examples of the method, apparatuses, and non-transitory computer-readable medium described herein, transmitting the control signaling may include operations, features, means, or instructions for transmitting RRC signaling indicating a set of multiple SRS resources, each SRS resource of the set of multiple SRS resources associated with one of the first set of antenna ports and one of the second set of antenna ports, where the second set of antenna ports includes a set of multiple SRS ports.

Some examples of the method, apparatuses, and non-transitory computer-readable medium described herein may further include operations, features, means, or instructions for indicating, in the RRC signaling, a mapping between a first antenna port of the first set of antenna ports to a first SRS resource associated with a first antenna port of the second set of antenna ports and to a second SRS resource associated with the first antenna port of the second set of antenna ports according to the RRC signaling, where receiving the one or more PTRSs may be based on the mapping.

In some examples of the method, apparatuses, and non-transitory computer-readable medium described herein, the quantity of antenna ports for PTRSs supported by the UE includes eight antenna ports, and a quantity of the set of multiple SRS resources includes eight SRS resources.

In some examples of the method, apparatuses, and non-transitory computer-readable medium described herein, the PTRSs may be associated with non-codebook based transmissions on a physical uplink shared channel.

In some examples of the method, apparatuses, and non-transitory computer-readable medium described herein, transmitting the control signaling may include operations, features, means, or instructions for transmitting a DCI message indicating that each antenna port of the first set of antenna ports may be associated with two or more antenna ports of the second set of antenna ports according to a first ratio of a set of candidate ratios, where the second set of antenna ports includes a set of multiple DMRS antenna ports.

Some examples of the method, apparatuses, and non-transitory computer-readable medium described herein may further include operations, features, means, or instructions for indicating, in a four-bit field in the DCI message, a mapping of each antenna port of the first set of antenna ports to the two or more antenna ports of the second set of antenna ports.

In some examples of the method, apparatuses, and non-transitory computer-readable medium described herein, each antenna port of the first set of antenna ports may be associated with two antenna ports of the second set of antenna ports, four antenna ports of the second set of antenna ports, or eight antenna ports of the second set of antenna ports, according to the first ratio.

Some examples of the method, apparatuses, and non-transitory computer-readable medium described herein may further include operations, features, means, or instructions for indicating, in a four-bit field in the DCI message, a mapping of each antenna port of the first set of antenna ports to the two or more antenna ports of the second set of antenna ports, where a first bit of the four-bit field indicates an association between a first antenna port of the first set of antenna ports and a first quantity of the second set of antenna ports and a second bit of the four-bit field indicates an association between a second antenna port of the first set of antenna ports and a second quantity of the second set of antenna ports that may be different from the first quantity of the second set of antenna ports.

In some examples of the method, apparatuses, and non-transitory computer-readable medium described herein, the PTRSs may be associated with non-codebook based transmissions on a physical uplink shared channel.

Some examples of the method, apparatuses, and non-transitory computer-readable medium described herein may further include operations, features, means, or instructions for receiving signaling indicating the quantity of antenna ports in the first set of antenna ports, the quantity of antenna ports in the first set of antenna ports being less than or equal to the quantity of antenna ports for PTRSs supported by the UE, where transmitting the control signaling may be based on transmitting the signaling indicating the quantity of antenna ports in the first set of antenna ports.

Some examples of the method, apparatuses, and non-transitory computer-readable medium described herein may further include operations, features, means, or instructions for transmitting signaling indicating a mapping between each antenna port of the quantity of antenna ports in the first set of antenna ports and the one or more antenna ports of the second set of antenna ports, where receiving the control signaling may be based on transmitting the signaling indicating the mapping, and where each antenna port of the first set of antenna ports corresponds to the one or more antenna ports of the second set of antenna ports according to the indicated mapping.

In some examples of the method, apparatuses, and non-transitory computer-readable medium described herein, receiving the PTRSs may include operations, features, means, or instructions for receiving the PTRSs according to a time density value for phase tracking reference signaling of a set of multiple time density values associated with a modulation and coding scheme based on the quantity of antenna ports in the first set of antenna ports satisfying a threshold.

In some examples of the method, apparatuses, and non-transitory computer-readable medium described herein, receiving the PTRSs may include operations, features, means, or instructions for receiving the PTRSs according to a frequency density value for phase tracking reference signaling of a set of multiple frequency density values associated with a modulation and coding scheme based on the quantity of antenna ports in the first set of antenna ports satisfying a threshold.

A method for wireless communications at a user equipment is described. The method may include receiving control signaling indicating resource block associated with a DMRS port, a type of DMRS configuration, an offset indicator, or any combination thereof, selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and transmitting one or more PTRSs in a resource element of the resource block according to the selected PTRS offset value.

An apparatus for wireless communications at a user equipment is described. The apparatus may include a processor, memory coupled with the processor, and instructions stored in the memory. The instructions may be executable by the processor to cause the apparatus to receive control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and transmit one or more PTRSs in a resource element of the resource block according to the selected PTRS offset value.

Another apparatus for wireless communications at a user equipment is described. The apparatus may include means for receiving control signaling indicating resource block associated with a DMRS port, a type of DMRS configuration, an offset indicator, or any combination thereof, means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and means for transmitting one or more PTRSs in a resource element of the resource block according to the selected PTRS offset value.

A non-transitory computer-readable medium storing code for wireless communications at a user equipment is described. The code may include instructions executable by a processor to receive control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and transmit one or more PTRSs in a resource element of the resource block according to the selected PTRS offset value.

A method for wireless communications at a network entity is described. The method may include transmitting control signaling indicating resource block associated with a DMRS port, a type of DMRS configuration, an offset indicator, or any combination thereof, selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and receiving one or more PTRSs in a resource element of the resource block according to the selected PTRS offset value.

An apparatus for wireless communications at a network entity is described. The apparatus may include a processor, memory coupled with the processor, and instructions stored in the memory. The instructions may be executable by the processor to cause the apparatus to transmit control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and receive one or more PTRSs in a resource element of the resource block according to the selected PTRS offset value.

Another apparatus for wireless communications at a network entity is described. The apparatus may include means for transmitting control signaling indicating resource block associated with a DMRS port, a type of DMRS configuration, an offset indicator, or any combination thereof, means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and means for receiving one or more PTRSs in a resource element of the resource block according to the selected PTRS offset value.

A non-transitory computer-readable medium storing code for wireless communications at a network entity is described. The code may include instructions executable by a processor to transmit control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table, and receive one or more PTRSs in a resource element of the resource block according to the selected PTRS offset value.

A method for wireless communications at a user equipment is described. The method may include receiving control signaling indicating resource block associated with a DMRS port, a type of DMRS configuration, an offset indicator, or any combination thereof, selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and transmitting one or more PTRSs in a resource element of the resource block according to the selected PTRS offset value.

An apparatus for wireless communications at a user equipment is described. The apparatus may include a processor, memory coupled with the processor, and instructions stored in the memory. The instructions may be executable by the processor to cause the apparatus to receive control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and transmit one or more PTRSs in a resource element of the resource block according to the selected PTRS offset value.

Another apparatus for wireless communications at a user equipment is described. The apparatus may include means for receiving control signaling indicating resource block associated with a DMRS port, a type of DMRS configuration, an offset indicator, or any combination thereof, means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and means for transmitting one or more PTRSs in a resource element of the resource block according to the selected PTRS offset value.

A non-transitory computer-readable medium storing code for wireless communications at a user equipment is described. The code may include instructions executable by a processor to receive control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and transmit one or more PTRSs in a resource element of the resource block according to the selected PTRS offset value.

A method for wireless communications at a network entity is described. The method may include transmitting control signaling indicating resource block associated with a DMRS port, a type of DMRS configuration, an offset indicator, or any combination thereof, selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and receiving one or more PTRSs in a resource element of the resource block according to the selected PTRS offset value.

An apparatus for wireless communications at a network entity is described. The apparatus may include a processor, memory coupled with the processor, and instructions stored in the memory. The instructions may be executable by the processor to cause the apparatus to transmit control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and receive one or more PTRSs in a resource element of the resource block according to the selected PTRS offset value.

Another apparatus for wireless communications at a network entity is described. The apparatus may include means for transmitting control signaling indicating resource block associated with a DMRS port, a type of DMRS configuration, an offset indicator, or any combination thereof, means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and means for receiving one or more PTRSs in a resource element of the resource block according to the selected PTRS offset value.

A non-transitory computer-readable medium storing code for wireless communications at a network entity is described. The code may include instructions executable by a processor to transmit control signaling indicating resource block associated with a DMRS port, a type of DMRS configuration, an offset indicator, or any combination thereof, select a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value, and receive one or more PTRSs in a resource element of the resource block according to the selected PTRS offset value.

BRIEF DESCRIPTION OF THE DRAWINGS

FIGS. 15 through 20 show flowcharts illustrating methods that support uplink PTRSs for multiple transmitters on uplink shared channels in accordance with one or more aspects of the present disclosure.

DETAILED DESCRIPTION

Figure 1:
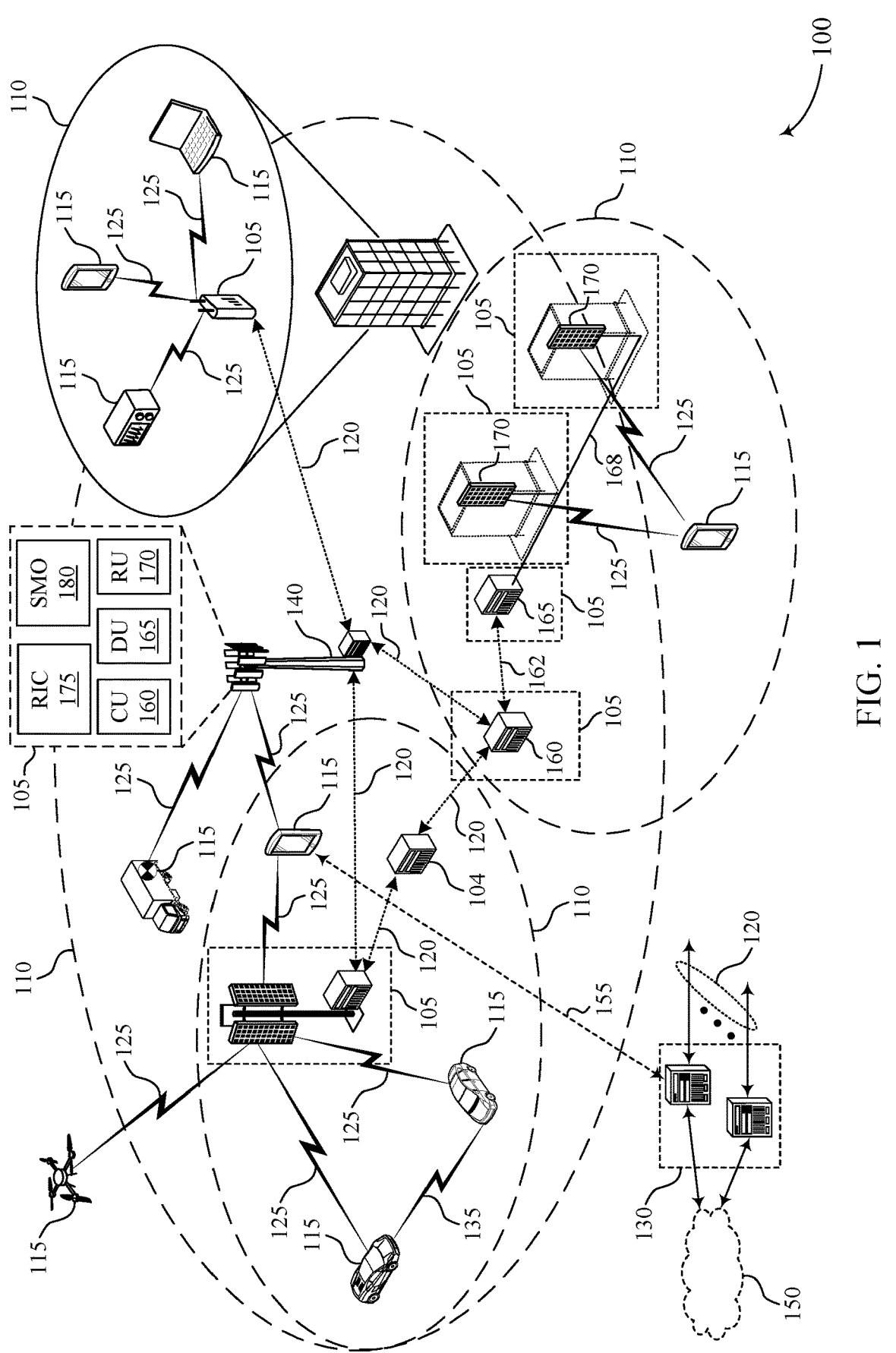
FIG. 1 illustrates an example of a wireless communications system that supports uplink phase tracking reference signals (PTRSs) for multiple transmitters on uplink shared channels in accordance with one or more aspects of the present disclosure.

In some wireless communications systems, a user equipment (UE) and a network entity may communicate using one or more antenna ports. Some UEs may support up to a number of transmit chains, such as four transmit chains. Sounding reference signal (SRS) resource configuration, SRS sounding procedures, demodulation reference signal (DMRS) procedures, and phase tracking reference signals (PTRSs) may support uplink communications using up to four transmit chains. For example, the UE may also transmit PTRSs, which may be received by a network entity and used to identify and correct phase noise errors. The UE may support up to two PTRS antenna ports which may be associated (e.g., via a quasi co-location (QCL) relationship) with other antenna ports (e.g., SRS antenna ports or DMRS antenna ports). However, in some examples (e.g., in 5G or 6G new radio (NR) wireless communications systems), some UEs may support a higher number of transmit chains (e.g., up to eight transmit chains) for data signaling (e.g., on a physical uplink shared channel (PUSCH)).

In some cases, techniques for SRS resource configuration, mapping of PTRS antenna ports to DMRS or SRS antenna ports, and uplink signaling (e.g., among other examples) that are based on a first number of supported transmit chains (e.g., four transmit chains) may not effectively support a higher number of transmit chains (e.g., eight transmit chains) for some UEs, which may result in failed or incomplete SRS procedures, increased latency, inefficient use of resources, and decreased user experience, among other disadvantages. For example, if the UE transmits uplink signaling using up to eight transmission layers (e.g., via four antenna panels) but only transmits PTRSs using up to two PTRS antenna ports (e.g., via only two antenna panels), then the phase noise error detection may be incomplete (e.g., may only result in phase noise error detection on half of the active transmission layers). This may result in incomplete phase noise error correction, failed transmissions, increased system latency, and decreased user experience.

Techniques described herein provide for PTRS antenna port configuration and use to support an increased number of transmission layers (e.g., up to eight transmission layers). In some examples, a UE may be able to support up to four PTRS antenna ports (e.g., instead of up to two PTRS antenna ports). The UE may transmit capability signaling indicating a number of supported PTRS antenna ports (e.g., up to 4). The network entity may transmit control signaling indicating a number of PTRS antenna ports and a mapping between the PTRS antenna ports and other ports (e.g., SRS antenna ports or DMRS antenna ports). For non-codebook based PUSCH transmissions, the network may configure (e.g., via RRC signaling) up to 8 SRS resources and a mapping between the SRS resources and up to four PTRS antenna ports. For codebook based PUSCH transmission, the network may configure (e.g., via DCI signaling) a mapping between up to four PTRS antenna ports and up to 8 DMRS antenna ports (e.g., or SRS antenna ports). In some examples, the UE may also indicate a requested number of PTRS antenna ports (e.g., which may be the same as or less than the supported number of PTRS antenna ports).

In some examples, the UE may transmit PTRSs according to updated lookup tables indicating time and frequency density of PTRSs. The UE may identify an entry in the lookup table for a given MCS, and may select a time density, or frequency density, or both, based on whether the UE is configured with a threshold quantity of PTRS antenna ports (e.g., whether the UE is configured with up to 2 PTRSs or up to 4 PTRSs). In some examples, the UE may also identify a resource element (RE) offset for transmitting PTRSs within a resource block (RB) based on an expanded table for up to eight transmission layers.

Aspects of the disclosure are initially described in the context of wireless communications systems. Aspects of the disclosure are further illustrated by and described with reference to wireless communications systems, PTRS antenna port configuration schemes, and process flows. Aspects of the disclosure are further illustrated by and described with reference to apparatus diagrams, system diagrams, and flowcharts that relate to uplink PTRSs for multiple transmitters on uplink shared channels.

FIG. 1 illustrates an example of a wireless communications system 100 that supports uplink PTRSs for multiple transmitters on uplink shared channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink PTRSs for multiple transmitters on uplink shared channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may support a quantity (e.g., eight) of PDSCH antenna ports, and a single antenna port may be designated for downlink PTRSs. Downlink PTRS density in time and frequency may be defined by one or more tables, such as Table 1 and Table 2.

TABLE 1

| Scheduled MCS | Time Density For Downlink PTRS (1/n) |
|---|---|
| $I_{MCS}$ < ptrs – MCS1 | PTRS not present |
| ptrs – MCS1 < $I_{MCS}$ < ptrs – MCS2 | 4 |
| ptrs – MCS2 < $I_{MCS}$ < ptrs – MCS3 | 2 |
| ptrs – MCS3 < $I_{MCS}$ < ptrs – MCS4 | 1 |

TABLE 2

| Contiguous Scheduled | Frequency Density For Downlink PTRS (1/n) |
|---|---|
| $N_{RB}$ < $N_{RB0}$ | PTRS not present |
| $N_{RB0}$ < $N_{RB}$ < $N_{RB1}$ | 2 |
| $N_{RB1}$ < $N_{RB}$ | 4 |

Downlink PTRS antenna ports may be associated with downlink DMRS antenna ports. For example, a downlink DMRS antenna port associated with a PTRS antenna port may be assumed to be quasi co-located with respect to a quasi co-location type (e.g., QCL-TypeA or QCL-TypeD). If the UE 115 is scheduled with one codeword, then the PTRS antenna port may be associated with a lowest indexed MDRS antenna port among a set of MRS antenna ports assigned for a PDSCH. If the UE 115 is scheduled with two codewords, then the PTRS antenna port may be associated with a lowest indexed DMRS antenna port among a set of DMRS antenna ports assigned for the codeword having the higher MCS. If the MCS indices of two codewords are the same, then the PTRS antenna port may be associated with a lowest indexed MRS antenna port assigned for codeword zero of the two codewords.

A UE 115 may support a quantity (e.g., four) of PTRS antenna ports, which may be defined for uplink transmissions. Uplink PTRS density in time and frequency may be given by Table 3 and Table 4.

TABLE 3

| Scheduled MCS | Time Density For Downlink PTRS (1/n) |
|---|---|
| $I_{MCS}$ < ptrs – MCS1 | PTRS not present |
| ptrs – MCS1 < $I_{MCS}$ < ptrs – MCS2 | 4 |
| ptrs – MCS2 < $I_{MCS}$ < ptrs – MCS3 | 2 |
| ptrs – MCS3 < $I_{MCS}$ < ptrs – MCS4 | 1 |

TABLE 4

| Contiguous Scheduled BW | Frequency Density For Uplink PTRS (1/n) |
|---|---|
| $N_{RB}$ < $N_{RB0}$ | PTRS not present |
| $N_{RB0}$ < $N_{RB}$ < $N_{RB1}$ | 2 |
| $N_{RB1}$ < $N_{RB}$ | 4 |

Uplink PTRS antenna ports may be associated with uplink DMRS antenna ports, uplink SRS antenna ports, PUSCH antenna ports, or a combination thereof. Uplink DMRS antenna ports associated with PTRS antenna ports may be assumed to be quasi co-located with respect to a QCL type (e.g., QCL-TypeA, or QCL-TypeD). For non-codebook based PUSCH, uplink PTRS to uplink DMRS antenna ports, SRS antenna ports, or PUSCH antenna ports, may be configured by RRC signaling. Each RS resources (e.g. each SRS or PUSCH port) may be configured (e.g., via RRC signaling) with an associated PTRS antenna port. In some examples, up to two PTRS antenna ports may be configured for up to four SRS resources. However, as described herein (e.g., with reference to FIG. 3), a UE 115 may be configured with up to four PTRS antenna ports for up to eight SRS resources (e.g., supporting up to eight transmission layers).

For codebook based PUSCHs, uplink PTRS to uplink DMRS or SRS or PUSCH port associations may be signaled via DCI (e.g., a two-bit field such as a PTRS-DMRS association field in a DCI message) that schedules uplink PUSCH transmissions. IF only one PTRS antenna port is configured for the UE 115, then a quantity of bits (e.g., two bits) in the PTRS-DMRS association DCI field may indicate that a PTRS antenna port is associated with which DMRS, PUSCH, or SRS antenna port. If two PTRS antenna ports are configured for the UE, then the PTRS antenna port 0 may be associated with PUSCH, DMRS, or SRS antenna port 1000 or 1002, while the PTRS antenna port 1 may be associated with PUSCH, DMRS, or SRS antenna port 1001 or 1003. In some examples, a most significant bit (MSB) of the DCI field of the field in the DCI may indicate that PTRS antenna port 0 is associated with either PUSCH, DMRS, or SRS antenna port 100 or 1002, while a least significant bit (LSB) of the same field in the DCI may indicate whether the PTRS antenna port 1 is associated with the PUSCH, DMRS, or SRS antenna port 1001 or 1003.

Techniques described herein provide for PTRS antenna port configuration and use to support an increased number of transmission layers (e.g., up to eight transmission layers). In some examples, a UE may be able to support up to four PTRS antenna ports (e.g., instead of up to two PTRS antenna ports). The UE 115 may transmit capability signaling indicating a number of supported PTRS antenna ports (e.g., up to 4). The network entity 105 may transmit control signaling indicating a number of PTRS antenna ports and a mapping between the PTRS antenna ports and other ports (e.g., SRS antenna ports or DMRS antenna ports). For non-codebook based PUSCH transmissions, the network may configure (e.g., via RRC signaling) up to 8 SRS resources and a mapping between the SRS resources and up to four PTRS antenna ports. For codebook based PUSCH transmission, the network may configure (e.g., via DCI signaling) a mapping between up to four PTRS antenna ports and up to 8 DMRS antenna ports (e.g., or SRS antenna ports). In some examples, the UE 115 may also indicate a requested number of PTRS antenna ports (e.g., which may be the same as or less than the supported number of PTRS antenna ports).

Figure 2:
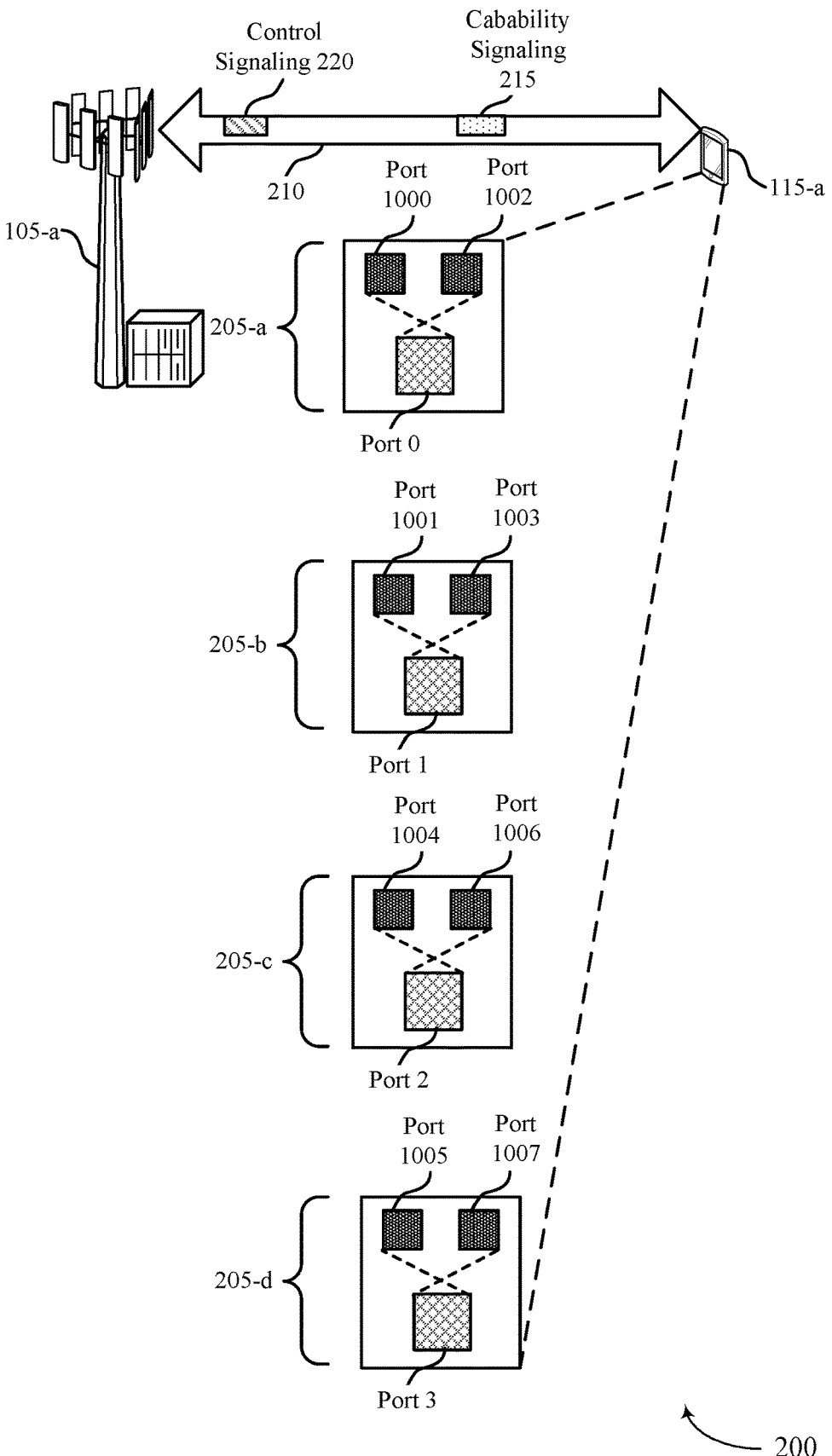
FIG. 2 illustrates an example of a wireless communications system that supports uplink PTRSs for multiple transmitters on uplink shared channels in accordance with one or more aspects of the present disclosure.

FIG. 2 illustrates an example of a wireless communications system 200 that supports uplink PTRSs for multiple transmitters on uplink shared channels in accordance with one or more aspects of the present disclosure. In some examples, the wireless communications system 200 may implement aspects of the wireless communications system 100. For example, the wireless communications system 200 may include a network entity 105-*a* and a UE 115-*a*, which may be examples of a network entity 105 and a UE 115 respectively, as described herein with reference to FIG. 1. The network entity 105-*a* and the UE 115-*a* may be in wireless communication with each other.

In some examples, the UE 115-*a* may support a number of transmit chains and a number of transmission layers (e.g., up to eight transmission layers). The UE 115-*a* may support eight transmission layer uplink operations (e.g., four and more transmission layers per UE.). Such a UE 115-*a* may support uplink DMRS procedures, SRS procedures, SRI procedures, and TPMI procedures (e.g., including codebook procedures), which may enable uplink transmissions via multiple (e.g., up to eight) transmission layers. Such procedures may support customer premise equipments (CPEs), fixed wireless access (FWA), vehicles, industrial devices, or the like. Such techniques, as described herein, may apply to fully coherent, partially coherent, or non-coherent transmissions. Techniques described herein may support PTRS procedures for up to eight PUSCH and DMRS antenna ports.

The UE 115-*a* and the network entity 105-*a* may communicate by using one or more antenna panels 205 (e.g., antenna panel 205-*a*, antenna panel 205-*b*, antenna panel 205-*c*, and antenna panel 205-*d*). In some examples, each antenna panel 205 may be associated with a local oscillator for generating and transmitting transmissions. Each antenna panel 205 may therefore generate a phase noise, which may be independent from phase noise generated by other antenna panels 205. For instance, the UE 115-*a* may support four uplink antenna panels 205, and each antenna panel 205 may support two antenna ports based on cross polarization. For example, each antenna of an antenna panel 205 (e.g., or sub panel, antenna array, or subpanel) may include at least one antenna port (e.g., associated with at least one antenna). Each antenna port may be utilized according to different polarizations, resulting in multiple antenna ports. For instance, the UE 115-*a* may support port 0 of antenna panel 205-*a* according to a first polarization, resulting in antenna port 1000, and according to a second polarization, resulting in antenna port 1002. Similarly, the UE 115-*a* may support port 1 of antenna panel 205-*b* according to a first polarization, resulting in antenna port 1001, and according to a second polarization, resulting in antenna port 1003. The UE 115-*a* may support antenna port 2 of antenna panel 205-*c* according to a first polarization, resulting in antenna port 1004, and according to a second polarization, resulting in antenna port 1006. And, in some examples, the UE 115-*a* may support port 3 of antenna panel 205-*d* according to a first polarization, resulting in antenna port 1005, and according to a second polarization, resulting in antenna port 1007.

In some examples, the UE 115-*a* may support one or more transmit chains, and may communicate with the network entity 105-*a* using one or more of the supported transmit chains. For example, if the UE 115-*a* supports eight transmit chains, the UE 115-*a* may communicate with the network entity 105-*a* (e.g., using MIMO techniques) on up to eight layers. The UE 115-*a* may utilize all or portions of the antenna panels 205 (e.g., or any number of arrays, subarrays, subpanels, and antenna elements. among other examples) to transmit the eight layers. In some examples, each antenna panel 205 may be associated with an independent oscillator, and as such, the antenna panel may include at least one PTRS antenna port. In such examples, each antenna panel may include at least one PTRS antenna port (e.g., antenna port 0, port 1, port 2, and port 3) and eight antenna ports for PUSCH, SRS, or DMRS transmissions (e.g., antenna port 1000, antenna port 1002, antenna port 1001, antenna port 1003, antenna port 1004, antenna port 1006, antenna port 1005, and antenna port 1007).

The network entity 105-*a* may communicate with the UE 115-*a* via the bidirectional communication link 210. In some examples, uplink signaling (e.g., data transmissions via a PUSCH, DMRS transmissions, SRS sounding, or the like) may include perming uplink transmissions via a quantity (e.g., eight) of transmission layers. However, if the UE 115-*a* does not transmit PTRSs via a sufficient number of PTRS antenna ports, then phase noise error estimation and mitigation may fail at the network entity 105-*a*. For example, uplink transmissions via up to four layers may be supported by two PTRS antenna ports. However, the UE 115-*a* may transmit up to eight transmission layers via four antenna panels 205, as described herein. Because each antenna panel 205 may be associated with an independent oscillator, phase noise may be different for each antenna panel 205. If the UE 115-*a* only supports up to two PTRS antenna ports (e.g., for four antenna panels 205), then at least two of the antenna panels 205 may perform uplink transmissions without transmitting PTRSs, in which case the network entity 105-*a* may be unable to perform phase error estimation and mitigation for the at least two antenna panels 205. Techniques for PTRS antenna port configuration and use for up to two PTRS antenna ports may not be sufficient for eight layer uplink transmissions, which may rely on up to four PTRS antenna ports. Such a lack of techniques for PTRS antenna port configuration and use may result in failed phase noise detection and mitigation, pour uplink performance by the UE 115-*a*, an increase in failed transmissions, an increase in retransmissions, less efficient use of available system resources, increased latency, and poor user experience.

As described here, the UE 115-*a* may support an increased number of uplink PTRS antenna ports (e.g., up to four antenna ports), for both non-codebook based PUSCH transmissions and codebook based PUSCH transmissions. The UE 115-*a* may transmit control signaling 215 indicating a number of PTRS antenna ports supported by the UE 115-*a* (e.g., four). In some examples, the capability signaling (e.g., in a same capability message or in a separate capability message) may indicate a requested or proposed number of PTRS antenna ports the UE 115-*a* will use for PTRS transmissions (e.g., up to four supported PTRS antenna ports). The network entity may transmit control signaling 220 (e.g., responsive to the capability signaling 215) indicating a number of PTRS antenna ports, and a mapping between the PTRS antenna ports and other antenna ports (e.g., SRS antenna ports, DMRS antenna ports, etc.). In some examples (e.g., for non-codebook based PUSCH transmissions as described in greater detail with reference to FIG. 3), the network entity 105-*a* may transmit control signaling 220 (e.g., RRC signaling) configuring an SRS resource set that supports sounding of up to eight SRS antenna ports (e.g., supporting up to eight transmission layers), and may further indicate a mapping between PTRS antenna ports supported by the UE 115-*a* and the SRS antenna ports. In some examples, (e.g., for codebook based PUSCH transmissions as described in greater detail with reference to FIG. 4), the network entity 105-*a* may transmit control signaling 220 (e.g., DCI signaling) indicating an association between PTRS antenna ports and other antenna ports (e.g., DMRS antenna ports). In such examples, the capability signaling 215 may also include a requested or proposed mapping between the requested number of PTRS antenna ports and the other antenna ports. In some examples, as described in greater detail with reference to FIG. 5, the UE 115-*a* may transmit PTRSs according to a time or frequency density that may be based on whether the UE 115-*a* supports a threshold number of PTRS antenna ports. In some examples, as described in greater detail with reference to FIG. 6, the UE 115-*a* may select an RE offset value for transmitting PTRSs based on one or more lookup tables that support up to eight transmission layers.

Figure 3:
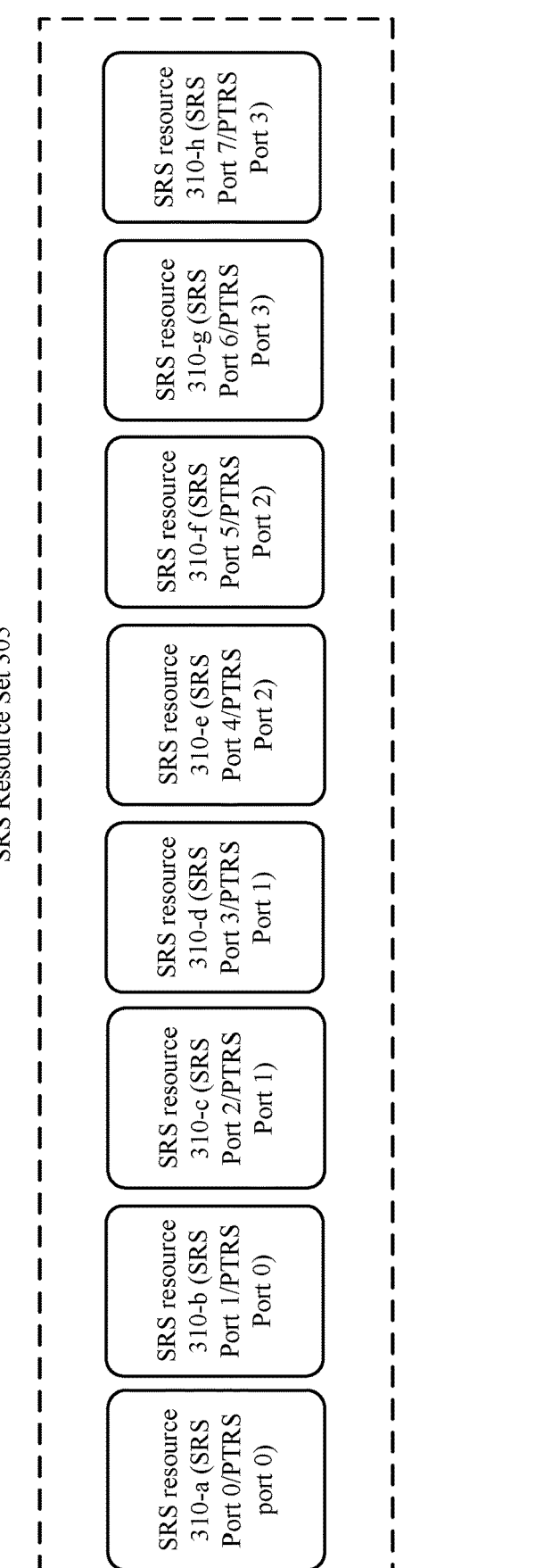
FIG. 3 illustrates an example of a PTRS antenna port configuration scheme that supports uplink PTRSs for multiple transmitters on uplink shared channels in accordance with one or more aspects of the present disclosure.

FIG. 3 illustrates an example of a PTRS antenna port configuration scheme 300 that supports uplink PTRSs for multiple transmitters on uplink shared channels in accordance with one or more aspects of the present disclosure. PTRS antenna port configuration scheme 300 may implement aspects of, or be implemented by aspects of, wireless communications system 100 and wireless communications system 200. For example, a UE and a network entity, which may be examples of corresponding devices described with reference to FIGS. 1 and 2, may communicate with each other in accordance with the PTRS antenna port configuration scheme 300.

In some examples, as described in greater detail with reference to FIG. 2, a UE may support up to a threshold number (e.g., eight) of transmission layers. In such examples, for non-codebook based PUSCH, the network entity may configure the UE with a port association (e.g., between uplink PTRS antenna ports and uplink DMRS, SRS, or PUSCH antenna ports) via RRC signaling. For instance, the network entity may transmit RRC signaling configuring an SRS resource set 305. In some examples, the SRS resource set 305 may include a quantity of SRS resources 310 that is equal to up to the quantity of supported transmission layers (e.g., eight SRS resources for up to eight transmission layers). In some examples, the RRC signaling may indicate that each SRS resource 310 (e.g., corresponding to an SRS antenna port or PUSCH antenna port) may be associated (e.g., as configured via RRC signaling) with a PTRS antenna port. For example, the SRS resources 310-*a* may be configured such that an SRS antenna port 0 is associated with a PTRS antenna port 0. The SRS resources 310-*b* may be configured such that an SRS antenna port 1 is associated with a PTRS antenna port 0. The SRS resources 310-*c* may be configured such that an SRS antenna port 2 is associated with a PTRS antenna port 1. The SRS resources 310-*d* may be configured such that an SRS antenna port 3 is associated with a PTRS antenna port 1. The SRS resources 310-*e* may be configured such that an SRS antenna port 4 is associated with a PTRS antenna port 2. The SRS resources 310-*f* may be configured such that an SRS antenna port 5 is associated with a PTRS antenna port 2. The SRS resources 310-*g* may be configured such that an SRS antenna port 6 is associated with a PTRS antenna port 3. The SRS resources 310-*h* may be configured such that an SRS antenna port 7 is associated with a PTRS antenna port 3.

The RRC signaling may indicate a mapping between each configured SRS resources 310 and the number of supported PTRS antenna ports (e.g., up to four PTRS antenna ports can be configured for up to four, or up to eight, SRS resources 310). The UE may transmit PTRSs via the PTRS antenna ports, as configured by the RRC signaling. In some examples, as described in greater detail with reference to FIG. 5, the UE may transmit capability signaling indicating a number of supported PTRS antenna ports, and the RRC signaling may configure the mapping between the PTRS antenna ports and the SRS antenna ports based thereon. In some examples, the capability information may further include a requested mapping or partitioning of SRS resources with a quantity of PTRS antenna ports (e.g., up to four PTRS antenna ports). The mapping between the PTRS antenna ports and the SRS antenna ports may be based on such capability signaling, the RRC signaling, or both (e.g., the eight SRS antenna ports may be mapped to less than eight antenna ports, such as subsets of four antenna ports, or larger SRS resources associated with multiple SRS antenna ports). The RRC signaling may indicate a ratio between the enhanced PTRS antenna ports and PUSCH antenna ports. The UE capability signaling may indicate, for example, 1, 2, or 4 PTRS antenna ports supported by or requested by the UE. The UE may, in some examples, fall back to a restriction (e.g., an SRI restriction or an RRC configuration restriction).

In some examples, as described in greater detail with reference to FIG. 4, the network may indicate an association between PTRS antenna ports and other antenna ports (e.g., DMRS antenna ports, SRS antenna ports, PUSCH antenna ports, among other examples) via dynamic signaling (e.g., DCI signaling).

Figure 4:
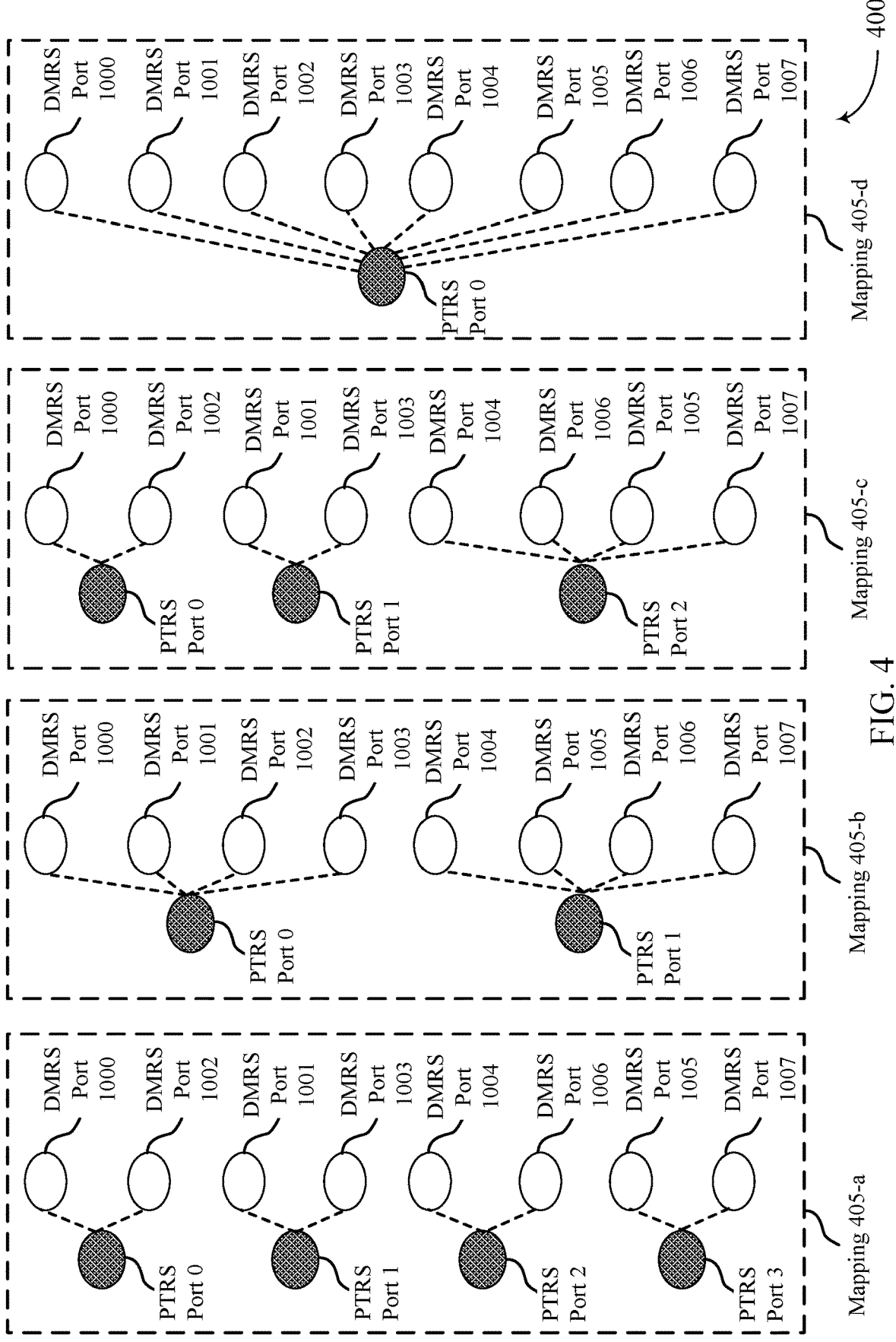
FIG. 4 illustrates an example of a PTRS antenna port configuration scheme that supports uplink PTRSs for multiple transmitters on uplink shared channels in accordance with one or more aspects of the present disclosure.

FIG. 4 illustrates an example of a PTRS antenna port configuration scheme 400 that supports uplink PTRSs for multiple transmitters on uplink shared channels in accordance with one or more aspects of the present disclosure. PTRS antenna port configuration scheme 400 may implement aspects of, or be implemented by aspects of, wireless communications system 100 and wireless communications system 200. For example, a UE and a network entity, which may be examples of corresponding devices described with reference to FIGS. 1 and 2, may communicate with each other in accordance with the PTRS antenna port configuration scheme 400.

For codebook based PUSCH transmissions, the network entity may indicate an association between supported PTRS antenna ports and other antenna ports (e.g., DMRS antenna ports) via DCI signaling. Although illustrated and described with reference to DMRS antenna ports, such dynamic indications of associations between PTRS antenna ports and other antenna ports may be applicable to any other antenna port (e.g., SRS antenna ports, or other PUSCH antenna ports, among other examples). Thus, a reference to a DMRS antenna port may also indicate another type of antenna port (e.g., an SRS antenna port, or other PUSCH antenna port). In some examples, the network entity may transmit a DCI message to the UE, which may include an association field (e.g., PTRS-DMRS association field). The field may be a four-bit field, which may indicate a mapping between PTRS antenna ports, and DMRS antenna ports.

In some examples, the network entity may configure four PTRS antenna ports (e.g., for four uplink panels, each uplink panel supporting two DMRS antenna ports). In such examples, the DCI field may indicate a mapping 405-*a*. In such examples, a first bit of the DCI field may indicate whether PTRS antenna port 0 is associated with DMRS antenna port 1000 or DMRS antenna port 1002, a second bit of the DCI field may indicate whether PTRS antenna port 1 is associated with DMRS antenna port 1001 or DMRS antenna port 1003, a third bit of the DCI field may indicate whether PTRS antenna port 2 is associated with DMRS antenna port 1004 or DMRS antenna port 1006, and a fourth bit of the DCI field may indicate whether PTRS antenna port 3 is associated with DMRS antenna port 1005 or DMRS antenna port 1007.

In some examples, the network entity may configure two PTRS antenna ports (e.g., for two uplink antenna panels, each antenna panel having four DMRS antenna ports). In such examples, the DCI field may indicate a mapping 405-*b*. For instance, a first bit and a second bit of the DCI field may indicate mapping between the PTRS antenna port 0 and two DMRS antenna ports (e.g., two of DMRS antenna port 1000, DMRS antenna port 1001, DMRS antenna port 1002, and DMRS antenna port 1003). Similarly, a third bit and a fourth bit of the DIC field may indicate mapping between the PTRS antenna port 1 and two DMRS antenna ports (e.g., two of DMRS antenna port 1004, DMRS antenna port 1005, DMRS antenna port 1006, and DMRS antenna port 1007).

In some examples, the network entity may configure three PTRS antenna ports (e.g., for three uplink antenna panels, two of the antenna panel having two DMRS antenna ports and one of the antenna panels having four DMRS antenna ports). In such examples, the DCI field may indicate a mapping 405-*c*. For example, a first bit of the DCI field may indicate a mapping between the PTRS antenna port 0 and either the DMRS antenna port 1000 or the DMRS antenna port 1002. A second bit of the DCI field may indicate a mapping between the PTRS antenna port 1 and either the DMRS antenna port 1001 or the DMRS antenna port 1003. A third bit and a fourth bit of the DCI field may indicate a mapping between the PTRS antenna port 2 and two of the four DMRS antenna ports (e.g., two of DMRS antenna port 1004, DMRS antenna port 1005, DMRS antenna port 1006, and DMRS antenna port 1007.

In some examples, the network entity may configure one PTRS antenna ports (e.g., for one uplink antenna panel having eight DMRS antenna ports). In such examples, the DCI field may indicate a mapping 405-*d*. For example, a three-bit DCI field (e.g., or three bits of a four-bit DCI field) may indicate a mapping between the PTRS antenna port 0 and the eight DMRS antenna ports.

In some examples, the UE may transmit capability signaling indicating a number of PTRS antenna ports supported by the UE (e.g., up to four PTRS antenna ports supporting up to eight transmission layers). In some examples, the UE may also transmit capability signaling (e.g., or other signaling) indicating a requested or candidate number of PTRS antenna ports (e.g., which may be less than the supported total number of PTRS antenna ports). For example, a UE may support up to four PTRS antenna ports, but may request a configuration of one PTRS antenna port (e.g., for mapping 405-*d*), two PTRS antenna ports (e.g., for mapping 405-*b*), three PTRS antenna ports (e.g. for mapping 405-*c*), or four PTRS antenna ports for mapping 405-*a*. In some examples, the UE may also transmit signaling indicating a preferred mapping or partition of DMRS antenna ports (e.g., according to the requested number of configured PTRS antenna ports).

For example, in one capability message, or in multiple messages, the UE may indicate a number of requested PTRS antenna ports (e.g., less than or equal to the number of PTRS antenna ports supported by the UE). This information may indicate that a total number of DMRS antenna ports (e.g., eight DMRS antenna ports) are to be partitioned into a number of subsets (e.g., for a requested configuration of three PTRS antenna ports, the eight DMRS antenna ports are to be divided into three subsets). In addition, the UE may also indicate how t partition the eight DMRS antenna ports into the three subsets (e.g., the UE may indicate which DMRS antenna ports fall into which subsets). For example, if the UE indicates three PTRS antenna ports, the UE also may indicate a mapping 405-*c*. For instance, the UE may indicate a first subset of DMRS antenna ports {1000,1002}, a second subset of DMRS antenna ports {1001, 1003}, and a third subset of DMRS antenna ports {1004, 1005, 1006, 1007}. Or, the UE may indicate a first subset of DMRS antenna ports {1000,1002}, a second subset of DMRS antenna ports {1001, 1003, 1004, and 1005}, and a third subset of DMRS antenna ports {1006, 1007}. Other configurations may also be possible. Thus, the UE may indicate (e.g., in a single capability message or in multiple separate messages) a total number of supported PTRS antenna ports, a number of requested PTRS antenna ports, a proposed or requested partitioning of DMRS antenna ports, or any combination thereof. Such capability reporting may also apply to SRS resource configuration as described in greater detail with reference to FIG. 3 (e.g., the UE may transmit such capability signaling to the network entity, and may receive the RRC signaling configuring the SRS resource set 350 based thereon).

Upon receiving such capability signaling, the network entity may generate and transmit the DCI message, including the DCI field. In some examples, the DCI field may be of a flexible size, and may be configured based on the received capability signaling (e.g., the network entity may generate and transmit a four-bit DCI field for mapping 405-*a*, or a three-bit DCI field for the mapping 405-*d*). In some examples, the DCI field may be defined to be four-bits, and one bit may remain null or may be ignored by the UE in cases of a three-bit indicator (e.g., for mapping 405-*d*). In some examples, the network entity may transmit a DCI indicating a mapping that corresponds to the requested partitioning, requested number of PTRS antenna ports, or a combination thereof. In some examples, the network entity may ensure that a configured number of PTRS antenna ports, mapping 405, or the like, does not exceed the reported quantity of supported PTRS antenna ports (e.g., however, the network entity may not be bound by the requested number of PTRS antenna ports or the requested partitioning).

Figure 5:
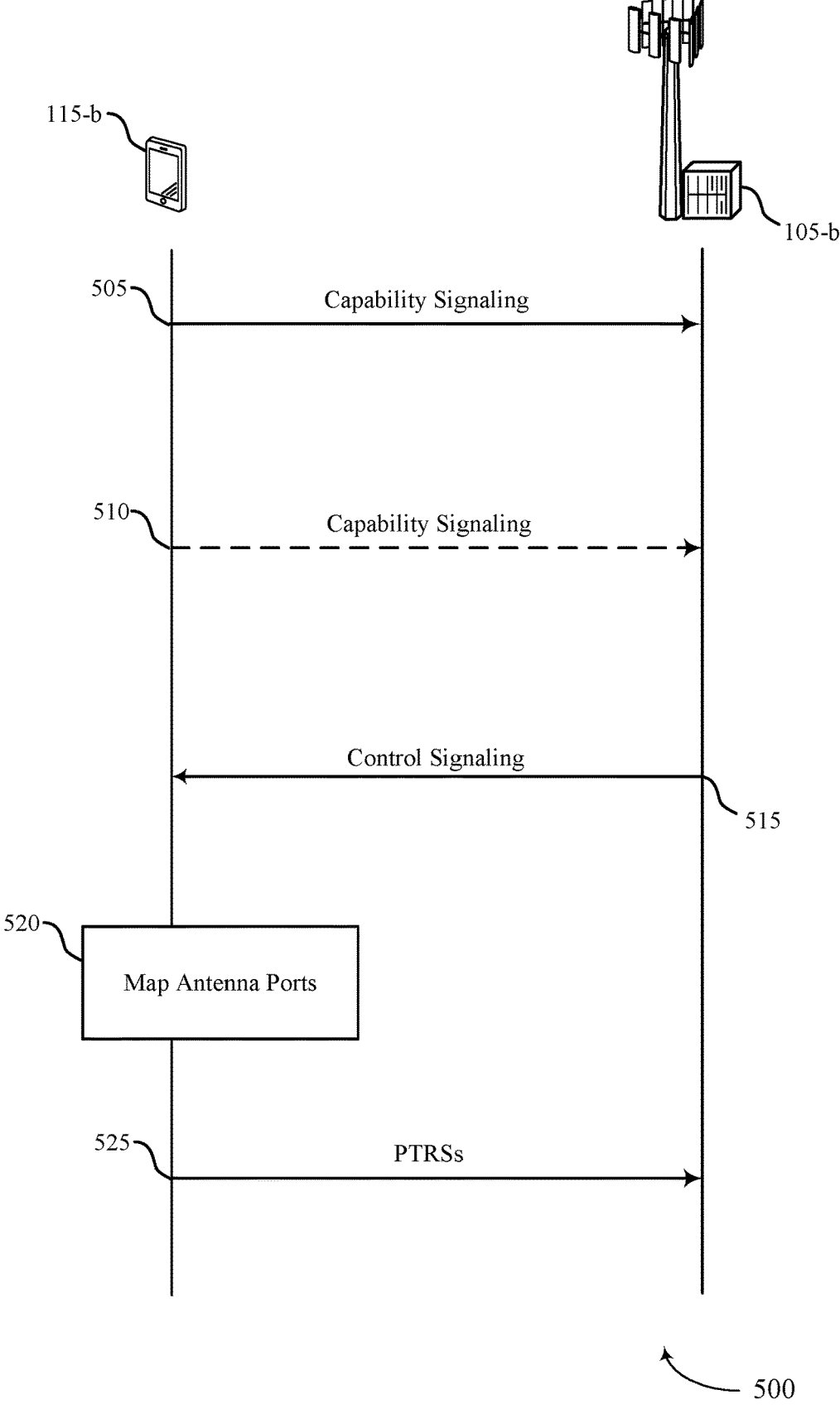
FIG. 5 illustrates an example of a process flow that supports uplink PTRSs for multiple transmitters on uplink shared channels in accordance with one or more aspects of the present disclosure.

FIG. 5 illustrates an example of a process flow 500 that supports uplink PTRSs for multiple transmitters on uplink shared channels in accordance with one or more aspects of the present disclosure. Process flow 500 may include a UE 115-*b* and a network entity 105-*b*, which may be examples of corresponding devices described with reference to FIGS. 1-4.

At 505, the UE 115-*b* may transmit capability signaling (e.g., to the network entity 105-*b*). The capability signaling may include an indication of a quantity of antenna ports for PTRSs supported by the UE 115-*b* (e.g., up to four PTRS antenna ports). Control signaling received at 515 may indicate a mapping between a first set antenna ports (e.g., the PTRS antenna ports) and a second set of antenna ports (e.g., SRS antenna ports, DMRS antenna ports, other PUSCH antenna ports, etc.).

In some examples (e.g., in a message at 505, or in a separate message at 510), the UE 115-*b* may transmit signaling (e.g., capability signaling) indicating a quantity of antenna ports in the first set of antenna ports (e.g., a number of requested PTRS antenna ports) that is less than or equal to the quantity of antenna ports for PTRSs supported by the UE 115-*b* (e.g., one, two, three, or four PTRS antenna ports, where the UE 115-*b* is capable of supporting four PTRS antenna ports). In some examples (e.g., in a single message at 505, in a second message at 510, or in still a third message), the UE 115-*b* may transmit signaling (e.g., capability information) indicating a mapping between each antenna port of the quantity of antenna ports in the first set of antenna ports and the one or more antenna ports of the second set of antenna ports (e.g., a partitioning of the second set of antenna ports according to the requested number of PTRS antenna ports, as described in greater detail with reference to FIG. 4).

At 515, the UE 115-*b* may receive (e.g., from the network entity 105-*b*), control signaling indicating the first set of antenna ports for PTRSs, each antenna port of the first set of antenna ports corresponding to one or more antenna ports of the second set of antenna ports. A quantity of antenna ports in the first set of antenna ports may satisfy (e.g., may not exceed) the quantity of antenna ports for PTRSs supported by the UE 115-*b*. In some examples, the quantity of antenna ports in the first set of antenna ports may also satisfy the quantity of antenna ports requested by the UE 115-*b* (e.g., which may be the same as or less than the quantity of PTRS antenna ports supported by the UE 115-*b*).

In some examples, the control signaling may be RRC signaling (e.g., for non-codebook based PUSCH transmissions, as described in greater detail with reference to FIG. 3). The RRC signaling may indicate multiple SRS resources, each SRS resources associated with one of the first set of antenna ports (e.g., one PTRS antenna port) and one of the second set of antenna ports (e.g., one of the SRS antenna ports). In such examples, at 520, the UE 115-*b* may map each PTRS antenna port to an SRS resource. For instance, for four PTRS antenna ports and eight SRS resources, the UE 115-*b* may map each PTRS antenna port to two SRS antenna ports (e.g., and two corresponding SRS resources).

In some examples, the control signaling may be DCI signaling (e.g., for codebook based PUSCH transmissions as described in greater detail with reference to FIG. 4). The DCI may indicate that each antenna port of the first set of antenna ports (e.g., each PTRS antenna port) is associated with two or more antenna ports of the second set of antenna ports (e.g., DMRS antenna ports, SRS antenna ports, or other PUSCH antenna ports) according to a first ratio of a set of candidate ratios. For example, the DCI may indicate a 1:2 mapping (e.g., for four PTRS antenna ports to eight DMRS antenna ports), a 1:4 mapping (e.g., for two PTRS antenna ports to eight DMRS antenna ports), a 1:8 mapping (e.g., for one PTRS antenna port to eight DMRS antenna ports), or a combination thereof (e.g., multiple 1:2 mappings for two PTRS antenna port to four DMRS antenna ports, and a 1:4 mapping for one PTRS antenna port to four more DMRS antenna ports, among other examples). In such examples, at 520, the UE 115-*b* may map the PTRS antenna ports to the DMRS antenna ports (e.g., may map each PTRS antenna port to two DMRS antenna ports, four DMRS antenna ports, or eight DMRS antenna ports). In some examples, as described in greater detail with reference to FIG. 4 (e.g., for a mapping 405-*c*), the UE 115-*b* may map each PTRS antenna port to two or more antenna ports of the second set of antenna ports according to a for-bit field in the DCI message, where a first bit of the field indicates an association between a first PTRS antenna port and a first quantity of the second set of antenna ports (e.g., two DMRS antenna ports), and a second bit of the field indicates an association between a second PTRS antenna port and a second quantity of the second set of antenna ports (e.g., four DMRS antenna ports), where the second quantity of the second set of antenna ports is different form the first quantity of the second set of antenna ports.

At 525, the UE 115-*b* may transmit PTRSs using the PTRS antenna ports (e.g., according to the control signaling received at 515 and the mapping performed at 520). In some examples, the UE 115-*b* may transmit the PTRSs according to a selected time density (e.g., on PTRS per a quantity of time intervals), a frequency density (e.g., one PTRS per a quantity of frequency resources), or both. For example, the UE 115-*b* may select a time density value, or a frequency density value, or both, from a set of time or frequency density values associated with a given MCS scheme based on a number of PTRS antenna ports satisfying a threshold number of PTRS antenna ports.

The UE 115-*b* may identify one or more lookup tables identifying candidate time densities, or frequency densities (e.g., or both), for PTRS transmission. For example, table 5 and table 6 may indicate time and frequency densities for PTRSs, where time density is dependent upon a threshold number of PTRS antenna ports.

TABLE 5

| Scheduled MCS | Time Density For Uplink PTRS (1/n) |
|---|---|
| $I_{MCS}$ < ptrs – MCS1 | PTRS not present |
| ptrs – MCS1 < $I_{MCS}$ < ptrs – MCS2 | 4 if # of PTRS antenna ports for PUSCH ≤ 2; 8 otherwise |
| ptrs – MCS2 < $I_{MCS}$ < ptrs – MCS3 | 2 if # of PTRS antenna ports for PUSCH ≤ 2 4 otherwise |
| ptrs – MCS3 < $I_{MCS}$ < ptrs – MCS4 | 1 if # of PTRS antenna ports for PUSCH ≤ 2 2 otherwise |

TABLE 6

| Contiguous Scheduled BW | Frequency Density For Uplink PTRS (1/n) |
|---|---|
| $N_{RB}$ < $N_{RB0}$ | PTRS not present |
| $N_{RB0}$ < $N_{RB}$ < $N_{RB1}$ | 2 |
| $N_{RB1}$ < $N_{RB}$ | 4 |

Thus, for a given MCS, the UE 115-*b* may determine a corresponding time density for transmitting PTRSs based on whether a number of PTRS antenna ports satisfies a threshold value. For instance, for an MCS that is greater than a first MCS threshold and less than a second MCS threshold (e.g., ptrs–MCS2<$I_{MCS}$<ptrs–MCS3), the UE may select a time density of 2 (e.g., one PTRS every other time interval, such as every other slot) if the UE 115-*b* supports up to two PTRS antenna ports (e.g., for up to four transmission layers). However, for the same MCS, the UE may select a time density of 4 if the UE 115-*b* supports more than two PTRS antenna ports (e.g., for up to eight transmission layers). The UE may thus increase the PTRS density in time based on a configured MCS and a number of supported PTRS antenna ports according to table 5, and may maintain a same PTRS density in frequency regardless of of a number of supported PTRS antenna ports according to table 6.

The UE 115-*b* may identify one or more lookup tables identifying candidate frequency densities, for PTRS transmission. For example, table 7 and table 8 may indicate time and frequency densities for PTRSs, where frequency density is dependent upon a threshold number of PTRS antenna ports.

TABLE 7

| Scheduled MCS | Time Density For Uplink PTRS (1/n) |
|---|---|
| $I_{MCS} <$ ptrs – MCS1 | PTRS not present |
| ptrs – MCS1 $< I_{MCS} <$ ptrs – MCS2 | 4 |
| ptrs – MCS2 $< I_{MCS} <$ ptrs – MCS3 | 2 |
| ptrs – MCS3 $< I_{MCS} <$ ptrs – MCS4 | 1 |

TABLE 8

| Contiguous Scheduled BW | Frequency Density For Uplink PTRS (1/n) |
|---|---|
| $N_{RB} < N_{RB0}$ | PTRS not present |
| $N_{RB0} < N_{RB} < N_{RB1}$ | 2 if # of PTRS antenna ports for PUSCH ≤ 2; 4 otherwise |
| $N_{RB1} < N_{RB}$ | 4 if # of PTRS antenna ports for PUSCH ≤ 2; 8 otherwise |

Thus, for a given contiguous scheduled BW (e.g., $N_{RB}$), the UE 115-*b* may determine a corresponding frequency density for transmitting PTRSs based on whether a number of PTRS antenna ports satisfies a threshold value. For instance, for a BW that is greater than a first BW threshold and less than a second BW threshold (e.g., $N_{RB0} < N_{RB} < N_{RB1}$, the UE may select a frequency density of 2 (e.g., one PTRS every other set of frequency resources, such as every other RE or RB) if the UE 115-*b* supports up to two PTRS antenna ports (e.g., two PTRS antenna ports for up to four transmission layers). However, for the same BW, the UE may select a frequency density of 4 if the UE 115-*b* supports more than two PTRS antenna ports (e.g., four PTRS antenna ports for up to eight transmission layers). The UE may thus increase the PTRS density in frequency according to table 8 (e.g., according to both a configured BW and a number of supported PTRS antenna ports), and may maintain a same PTRS density in time according to table 7 regardless of supported PTRS antenna ports.

The UE 115-*b* may select time and frequency density for PTRSs according to a pair of tables (e.g., table 5 and table 6, or table 7 and table 8), which may be configured or preconfigured at the UE 115-*b*, or may be included in one or more standards for wireless communication.

In some cases, the UE 115-*b* may transmit the PTRSs according to an RE offset as described with reference to FIG. 6.

Figure 6:
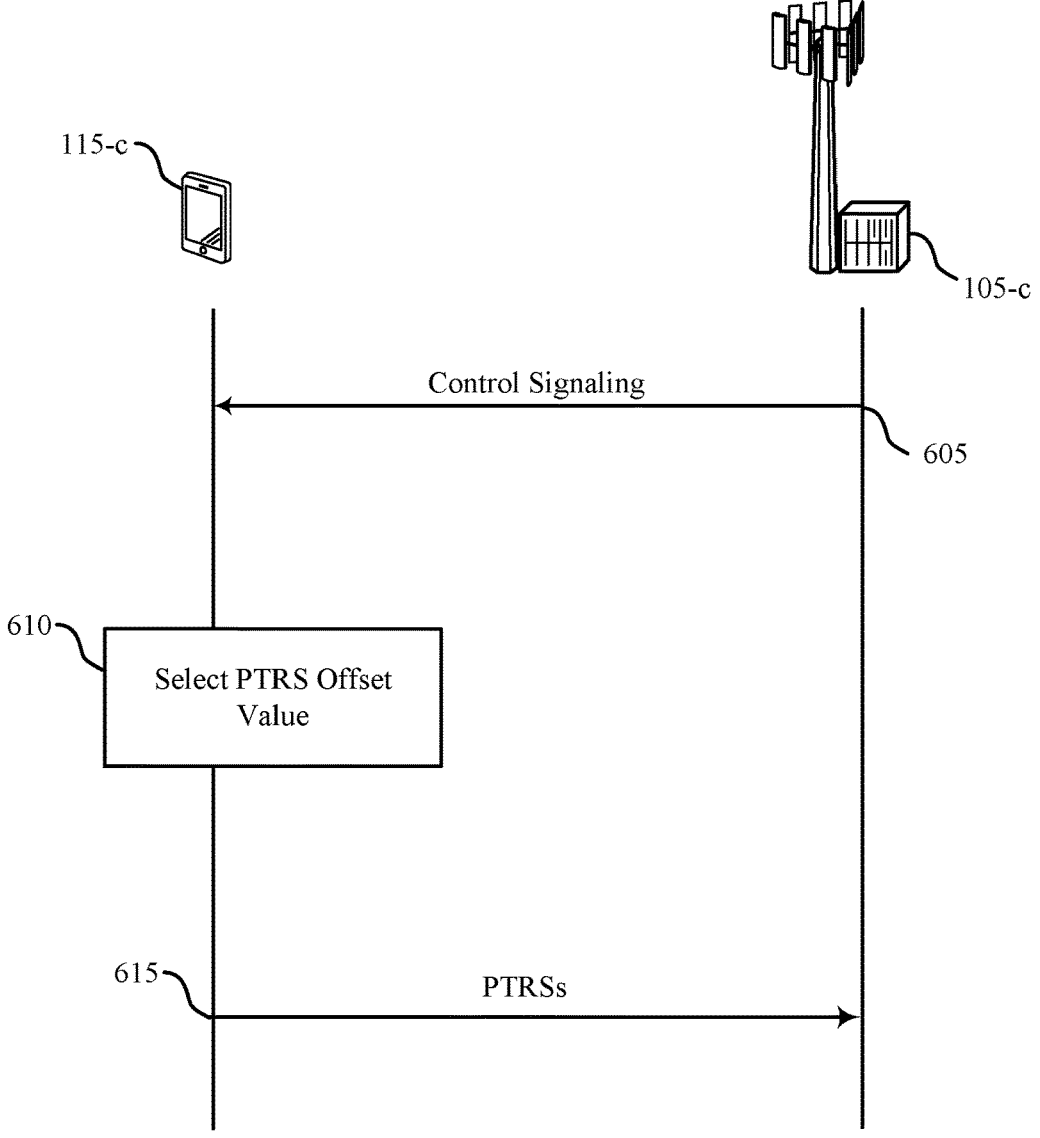
FIG. 6 illustrates an example of a process flow that supports uplink PTRSs for multiple transmitters on uplink shared channels in accordance with one or more aspects of the present disclosure.

FIG. 6 illustrates an example of a process flow 600 that supports uplink PTRSs for multiple transmitters on uplink shared channels in accordance with one or more aspects of the present disclosure. Process flow 600 may include a UE 115-*b* and a network entity 105-*b*, which may be examples of corresponding devices described with reference to FIGS. 1-5. The UE 115-*c* may transmit PTRSs, as described with reference to FIGS. 1-6. The UE 115-*c* may transmit PTRSs via time and frequency resources within an RB. The UE 115-*c* may select the resources via which to transmit the PTRSs according to an RE offset. A PTRS RE location in selected RBs may be based on an associated DMRS antenna port. For example, DMRS procedures may be enhanced to support up to a threshold number of DMRS antenna ports (e.g., twelve DMRS antenna ports)) per OFDM symbol. The UE 115-*c* may select an RE offset for transmitting PTRSs according to table 9 or according to table 10.

TABLE 9

| | $k_{ref}^{RE}$ DMRS Configuration Type 1 Resource Element Offset | | | | | $k_{ref}^{RE}$ DMRS Configuration Type 2 Resource Element Offset | | | |
|---|---|---|---|---|---|---|---|---|---|
| DMRS Port | Offset 00 | Offset 01 | Offset 10 | Offset 11 | DMRS Port | Offset 00 | Offset 01 | Offset 10 | Offset 11 |
| 1000 | 0 | 2 | 6 | 8 | 1000 | 0 | 1 | 6 | 7 |
| 1001 | 2 | 4 | 8 | 10 | 1001 | 1 | 6 | 7 | 0 |
| 1002 | 1 | 3 | 7 | 9 | 1002 | 2 | 3 | 8 | 9 |
| 1003 | 3 | 5 | 9 | 11 | 1003 | 3 | 8 | 9 | 2 |
| 1008 | 6 | 8 | 0 | 2 | 1004 | 4 | 5 | 10 | 11 |
| 1009 | 8 | 10 | 2 | 4 | 1005 | 5 | 10 | 11 | 4 |
| 1010 | 7 | 9 | 1 | 3 | 1012 | 6 | 7 | 0 | 1 |
| 1011 | 9 | 11 | 3 | 5 | 1013 | 7 | 0 | 1 | 6 |
| | | | | | 1014 | 8 | 9 | 2 | 3 |
| | | | | | 1015 | 9 | 2 | 3 | 8 |
| | | | | | 1016 | 10 | 11 | 4 | 5 |
| | | | | | 1017 | 11 | 4 | 5 | 10 |
| 1000 | 0 | 2 | 6 | 8 | 1000 | 0 | 1 | 6 | 7 |
| 1001 | 2 | 4 | 8 | 10 | 1001 | 1 | 6 | 7 | 0 |
| 1002 | 1 | 3 | 7 | 9 | 1002 | 2 | 3 | 8 | 9 |
| 1003 | 3 | 5 | 9 | 11 | 1003 | 3 | 8 | 9 | 2 |
| 1008 | 4 | 6 | 10 | 0 | 1004 | 4 | 5 | 10 | 11 |
| 1009 | 6 | 8 | 0 | 2 | 1005 | 5 | 10 | 11 | 4 |
| 1010 | 5 | 7 | 11 | 1 | 1012 | 6 | 7 | 0 | 1 |
| 1011 | 7 | 9 | 1 | 3 | 1013 | 7 | 0 | 1 | 6 |
| | | | | | 1014 | 8 | 9 | 2 | 3 |
| | | | | | 1015 | 9 | 2 | 3 | 8 |
| | | | | | 1016 | 10 | 11 | 4 | 5 |
| | | | | | 1017 | 11 | 4 | 5 | 10 |

At 605, the UE 115-*c* may receive (e.g., from the network entity 105-*c*) control signaling indicating an RB associated with a DMRS antenna port (e.g., $k_{ref}^{RE}$), a type of DMRS configuration (e.g., DMRS configuration type 1 or type 2), an offset indicator (e.g., 00, 01, 10, or 11), or any combination thereof. The control signaling may be conveyed via one or more RRC messages.

At 610, the UE 115-*c* may select a PTRS offset value from a lookup table (e.g., table 9 or table 10, which may be configured at the UE 115-*c*, or defined in one or more standards documents) based on the control signaling received at 605. Each row of the lookup table may be associated with a DMRS signal, and each column of the lookup table for a respective type of DMRS (e.g., DMRS configuration type 1 or type 2 as indicated via the control signaling) may be associated with an offset indicator (e.g., 00, 01, 10, or 11).

In some examples (e.g., table 9), a set of entries in a first portion of each column of the lookup table may be the same as a set of entries in a second portion of another column of the lookup table. For example, the last four entries in the column associated with DMRS configuration type 1 and offset 00 (e.g., as indicated via higher layer signaling such as an RRC information element (IE) resourceElementOffset) for DMRS antenna ports 1008, 1009, 1010, and 1011, respectively, may be the same as the first four entries in the column associated with DMRS configuration type 1 and offset 10 for DMRS antenna ports 1000, 1001, 1002, and 1003, respectively. Similarly, the last four entries in the column associated with DMRS configuration type 1 and offset 01 for DMRS antenna ports 1008, 1009, 1010, and 1011, respectively, may be the same as the first four entries in the column associated with DMRS configuration type 1 and offset 11 for DMRS antenna ports 1000, 1001, 1002, and 1003, respectively. Additionally, or alternatively, the last six entries in the column associated with DMRS configuration type 2 and offset 00 for DMRS antenna ports 1012, 1013, 1014, 1015, 1016, and 1017, respectively, may be the same as the first six entries in the column associated with DMRS configuration type 2 and offset 10 for DMRS antenna ports 1000, 1001, 1002, 1003, 1004, and 1005, respectively.

In some examples (e.g., table 10), for each row of the lookup table, a second entry in a row of the lookup table may be equal to a first entry incremented by a first value, and a third entry in the row may be equal to the second entry incremented by a second value that is different from the first value. In some examples, a fourth entry in the row may be equal to the third entry incremented by the first value. For example, for a first row associated with a first type of DMRS configuration (e.g., DMRS configuration type 1) and a first DMRS antenna port 1000, the second entry in the row (e.g., two) may be equal to the first entry in the row incremented by a first value (e.g., two), the third entry in the row (e.g., six) may be equal to the second entry incremented by a second value (e.g., four), and the fourth entry in the row (e.g., eight) may be equal to the third entry incremented by the first value (e.g., two). The second row may have a new initial value for the first entry (e.g., two), but may follow the same pattern (e.g., each entry in the second row is equal to the first entry incremented by two, the third entry in each row is the second entry incremented by four, etc.). The same pattern may extend through the entirety of populated rows (e.g., through DMRS antenna port 1011 for DMRS configuration type 1, and through DMRS antenna port 1017 for DMRS configuration type 2).

At 615, the UE 115-*c* may apply the selected RE offset (e.g., within an indicated RB, the UE may select an RE based on the selected RE offset), and may transmit the PTRSs via the selected RE or REs.

Figure 7:
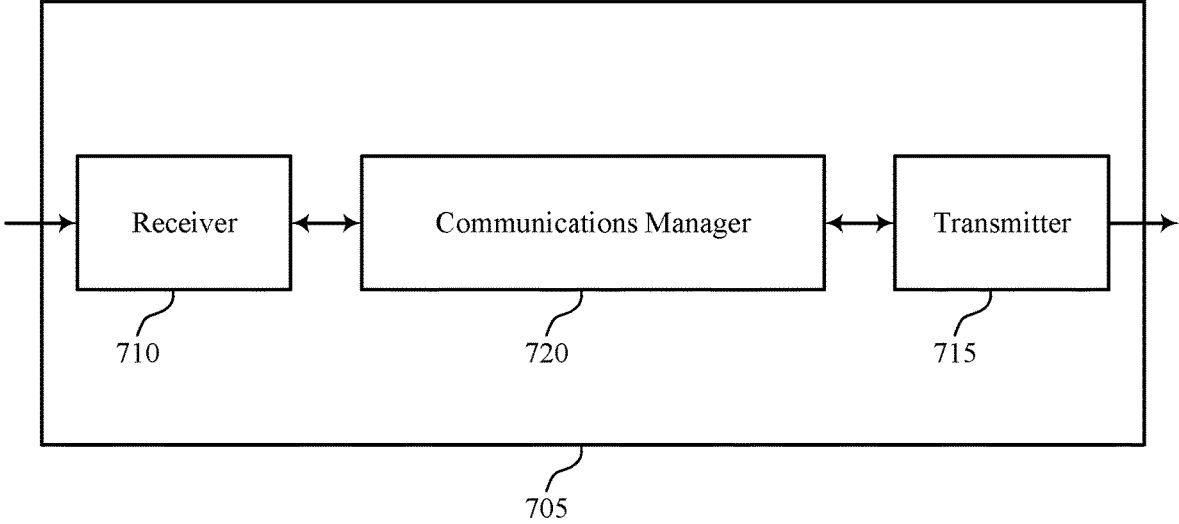
FIGS. 7 and 8 show block diagrams of devices that support uplink PTRSs for multiple transmitters on uplink shared channels in accordance with one or more aspects of the present disclosure.

FIG. 7 shows a block diagram 700 of a device 705 that supports uplink PTRSs for multiple transmitters on uplink shared channels in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink PTRSs for multiple transmitters on uplink shared channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink PTRSs for multiple transmitters on uplink shared channels). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of uplink PTRSs for multiple transmitters on uplink shared channels as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for transmitting capability signaling indicating a quantity of antenna ports for PTRSs supported by the UE. The communications manager 720 may be configured as or otherwise support a means for receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The communications manager 720 may be configured as or otherwise support a means for transmitting one or more PTRSs using the first set of antenna ports.

Additionally, or alternatively, the communications manager 720 may support wireless communications at a user equipment in accordance with examples as disclosed herein. For example, the communications manager 720 may be configured as or otherwise support a means for receiving control signaling indicating resource block associated with a DMRS antenna port, a type of DMRS configuration, an offset indicator, or any combination thereof. The communications manager 720 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The communications manager 720 may be configured as or otherwise support a means for transmitting one or more PTRSs in an RE of the RB according to the selected PTRS offset value.

Additionally, or alternatively, the communications manager 720 may support wireless communications at a user equipment in accordance with examples as disclosed herein. For example, the communications manager 720 may be configured as or otherwise support a means for receiving control signaling indicating resource block associated with a DMRS antenna port, a type of DMRS configuration, an offset indicator, or any combination thereof. The communications manager 720 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The communications manager 720 may be configured as or otherwise support a means for transmitting one or more PTRSs in an RE of the RB according to the selected PTRS offset value.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for PTRS antenna port configuration and use resulting in improved phase noise error detection and mitigation, improved reliability of communication, more efficient utilization of available system resources, and improved user experience.

Figure 8:
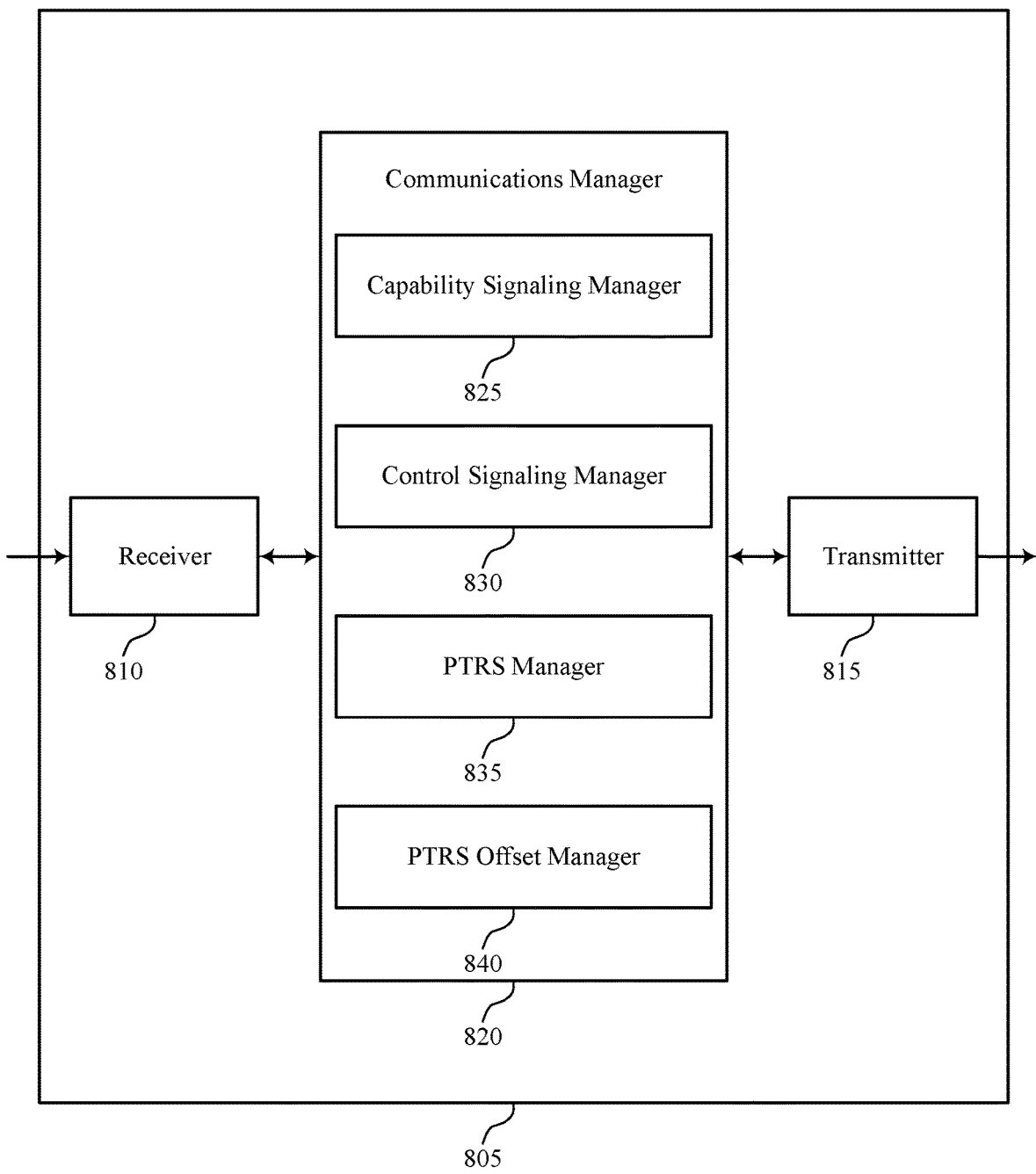

FIG. 8 shows a block diagram 800 of a device 805 that supports uplink PTRSs for multiple transmitters on uplink shared channels in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink PTRSs for multiple transmitters on uplink shared channels). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink PTRSs for multiple transmitters on uplink shared channels). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of uplink PTRSs for multiple transmitters on uplink shared channels as described herein. For example, the communications manager 820 may include a capability signaling manager 825, a control signaling manager 830, an PTRS manager 835, an PTRS offset manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The capability signaling manager 825 may be configured as or otherwise support a means for transmitting capability signaling indicating a quantity of antenna ports for PTRSs supported by the UE. The control signaling manager 830 may be configured as or otherwise support a means for receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE.

The PTRS manager 835 may be configured as or otherwise support a means for transmitting one or more PTRSs using the first set of antenna ports.

Additionally, or alternatively, the communications manager 820 may support wireless communications at a user equipment in accordance with examples as disclosed herein. The control signaling manager 830 may be configured as or otherwise support a means for receiving control signaling indicating resource block associated with a DMRS antenna port, a type of DMRS configuration, an offset indicator, or any combination thereof. The PTRS offset manager 840 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The PTRS manager 835 may be configured as or otherwise support a means for transmitting one or more PTRSs in an RE of the RB according to the selected PTRS offset value.

Additionally, or alternatively, the communications manager 820 may support wireless communications at a user equipment in accordance with examples as disclosed herein. The control signaling manager 830 may be configured as or otherwise support a means for receiving control signaling indicating resource block associated with a DMRS antenna port, a type of DMRS configuration, an offset indicator, or any combination thereof. The PTRS offset manager 840 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The PTRS manager 835 may be configured as or otherwise support a means for transmitting one or more PTRSs in an RE of the RB according to the selected PTRS offset value.

Figure 9:
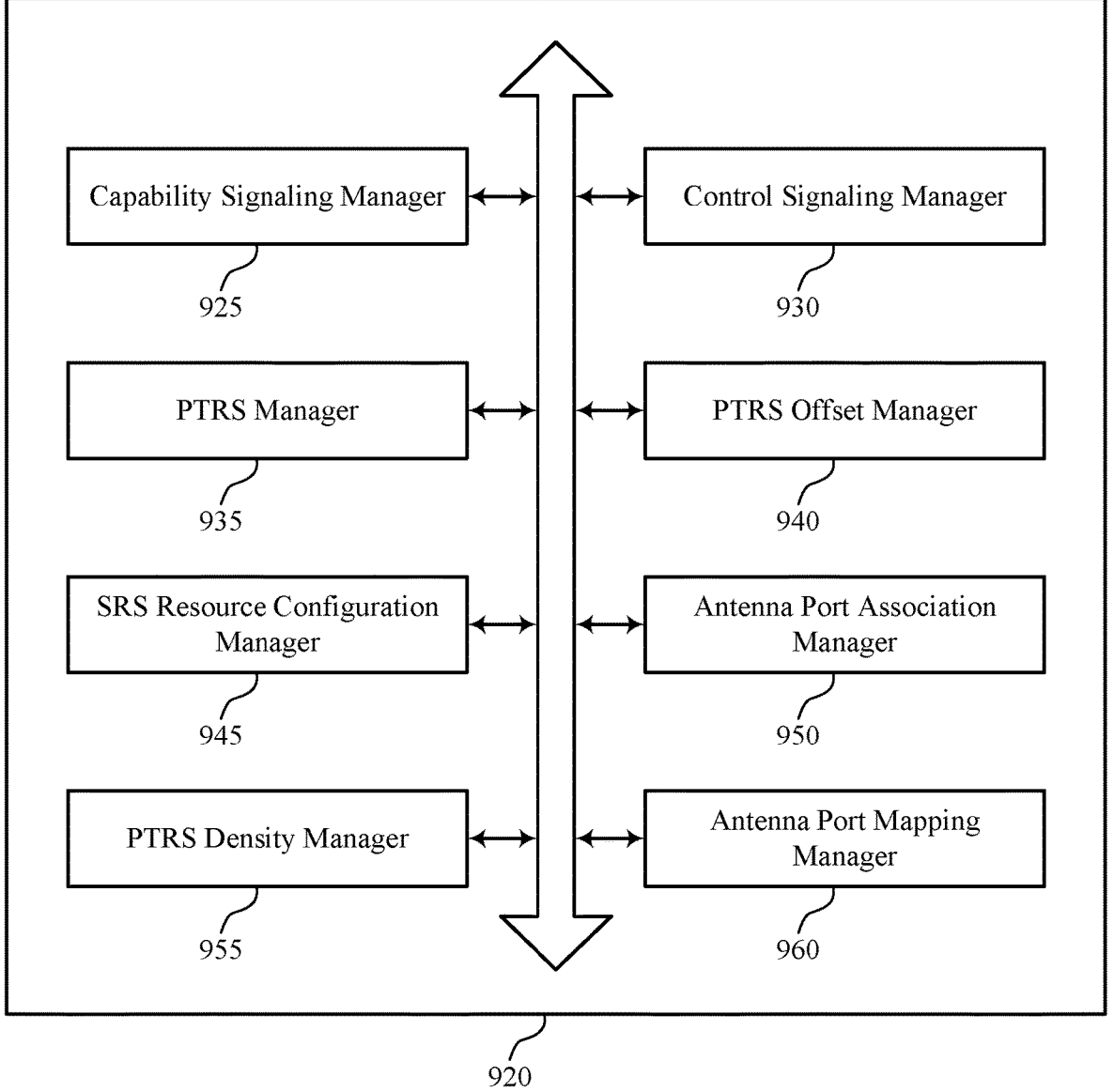
FIG. 9 shows a block diagram of a communications manager that supports uplink PTRSs for multiple transmitters on uplink shared channels in accordance with one or more aspects of the present disclosure.

FIG. 9 shows a block diagram 900 of a communications manager 920 that supports uplink PTRSs for multiple transmitters on uplink shared channels in accordance with one or more aspects of the present disclosure. The communications manager 920 may be an example of aspects of a communications manager 720, a communications manager 820, or both, as described herein. The communications manager 920, or various components thereof, may be an example of means for performing various aspects of uplink PTRSs for multiple transmitters on uplink shared channels as described herein. For example, the communications manager 920 may include a capability signaling manager 925, a control signaling manager 930, an PTRS manager 935, an PTRS offset manager 940, an SRS resource configuration manager 945, an antenna port association manager 950, an PTRS density manager 955, an antenna port mapping manager 960, or any combination thereof. Each of these components may communicate, directly or indirectly, with one another (e.g., via one or more buses).

The communications manager 920 may support wireless communications at a UE in accordance with examples as disclosed herein. The capability signaling manager 925 may be configured as or otherwise support a means for transmitting capability signaling indicating a quantity of antenna ports for PTRSs supported by the UE. The control signaling manager 930 may be configured as or otherwise support a means for receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The PTRS manager 935 may be configured as or otherwise support a means for transmitting one or more PTRSs using the first set of antenna ports.

In some examples, to support receiving the control signaling, the SRS resource configuration manager 945 may be configured as or otherwise support a means for receiving RRC signaling indicating a set of multiple SRS resources, each SRS resource of the set of multiple SRS resources associated with one of the first set of antenna ports and one of the second set of antenna ports, where the second set of antenna ports includes a set of multiple SRS antenna ports.

In some examples, the antenna port mapping manager 960 may be configured as or otherwise support a means for mapping a first antenna port of the first set of antenna ports to a first SRS resource associated with a first antenna port of the second set of antenna ports and to a second SRS resource associated with the first antenna port of the second set of antenna ports according to the RRC signaling, where transmitting the one or more PTRSs is based on the mapping.

In some examples, the quantity of antenna ports for PTRSs supported by the UE includes eight antenna ports, and a quantity of the set of multiple SRS resources includes eight SRS resources.

In some examples, the PTRSs are associated with non-codebook based transmissions on a physical uplink shared channel.

In some examples, to support receiving the control signaling, the antenna port association manager 950 may be configured as or otherwise support a means for receiving a DCI message indicating that each antenna port of the first set of antenna ports is associated with two or more antenna ports of the second set of antenna ports according to a first ratio of a set of candidate ratios, where the second set of antenna ports includes a set of multiple DMRS antenna ports.

In some examples, the antenna port mapping manager 960 may be configured as or otherwise support a means for mapping each antenna port of the first set of antenna ports to the two or more antenna ports of the second set of antenna ports according to a four-bit field in the DCI message.

In some examples, each antenna port of the first set of antenna ports is associated with two antenna ports of the second set of antenna ports, four antenna ports of the second set of antenna ports, or eight antenna ports of the second set of antenna ports, according to the first ratio.

In some examples, the antenna port mapping manager 960 may be configured as or otherwise support a means for mapping each antenna port of the first set of antenna ports to the two or more antenna ports of the second set of antenna ports according to a four-bit field in the DCI message, where a first bit of the four-bit field indicates an association between a first antenna port of the first set of antenna ports and a first quantity of the second set of antenna ports, and a second bit of the four-bit field indicates an association between a second antenna port of the first set of antenna ports and a second quantity of the second set of antenna ports that is different from the first quantity of the second set of antenna ports.

In some examples, the PTRSs are associated with non-codebook based transmissions on a physical uplink shared channel.

In some examples, the capability signaling manager 925 may be configured as or otherwise support a means for transmitting signaling indicating the quantity of antenna ports in the first set of antenna ports, the quantity of antenna ports in the first set of antenna ports being less than or equal to the quantity of antenna ports for PTRSs supported by the UE, where receiving the control signaling is based on transmitting the signaling indicating the quantity of antenna ports in the first set of antenna ports.

In some examples, the capability signaling manager 925 may be configured as or otherwise support a means for transmitting signaling indicating a mapping between each antenna port of the quantity of antenna ports in the first set of antenna ports and the one or more antenna ports of the second set of antenna ports, where receiving the control signaling is based on transmitting the signaling indicating the mapping, and where each antenna port of the first set of antenna ports corresponds to the one or more antenna ports of the second set of antenna ports according to the indicated mapping.

In some examples, the PTRS density manager 955 may be configured as or otherwise support a means for selecting a time density value for phase tracking reference signaling from a set of multiple time density values associated with a modulation and coding scheme based on the quantity of antenna ports in the first set of antenna ports satisfying a threshold, where transmitting the PTRSs is based on the selecting.

In some examples, the PTRS density manager 955 may be configured as or otherwise support a means for selecting a frequency density value for phase tracking reference signaling from a set of multiple frequency density values associated with a modulation and coding scheme based on the quantity of antenna ports in the first set of antenna ports satisfying a threshold, where transmitting the PTRSs is based on the selecting.

Additionally, or alternatively, the communications manager 920 may support wireless communications at a user equipment in accordance with examples as disclosed herein. In some examples, the control signaling manager 930 may be configured as or otherwise support a means for receiving control signaling indicating resource block associated with a DMRS antenna port, a type of DMRS configuration, an offset indicator, or any combination thereof. The PTRS offset manager 940 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. In some examples, the PTRS manager 935 may be configured as or otherwise support a means for transmitting one or more PTRSs in an RE of the RB according to the selected PTRS offset value.

Additionally, or alternatively, the communications manager 920 may support wireless communications at a user equipment in accordance with examples as disclosed herein. In some examples, the control signaling manager 930 may be configured as or otherwise support a means for receiving control signaling indicating resource block associated with a DMRS antenna port, a type of DMRS configuration, an offset indicator, or any combination thereof. In some examples, the PTRS offset manager 940 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. In some examples, the PTRS manager 935 may be configured as or otherwise support a means for transmitting one or more PTRSs in an RE of the RB according to the selected PTRS offset value.

Figure 10:
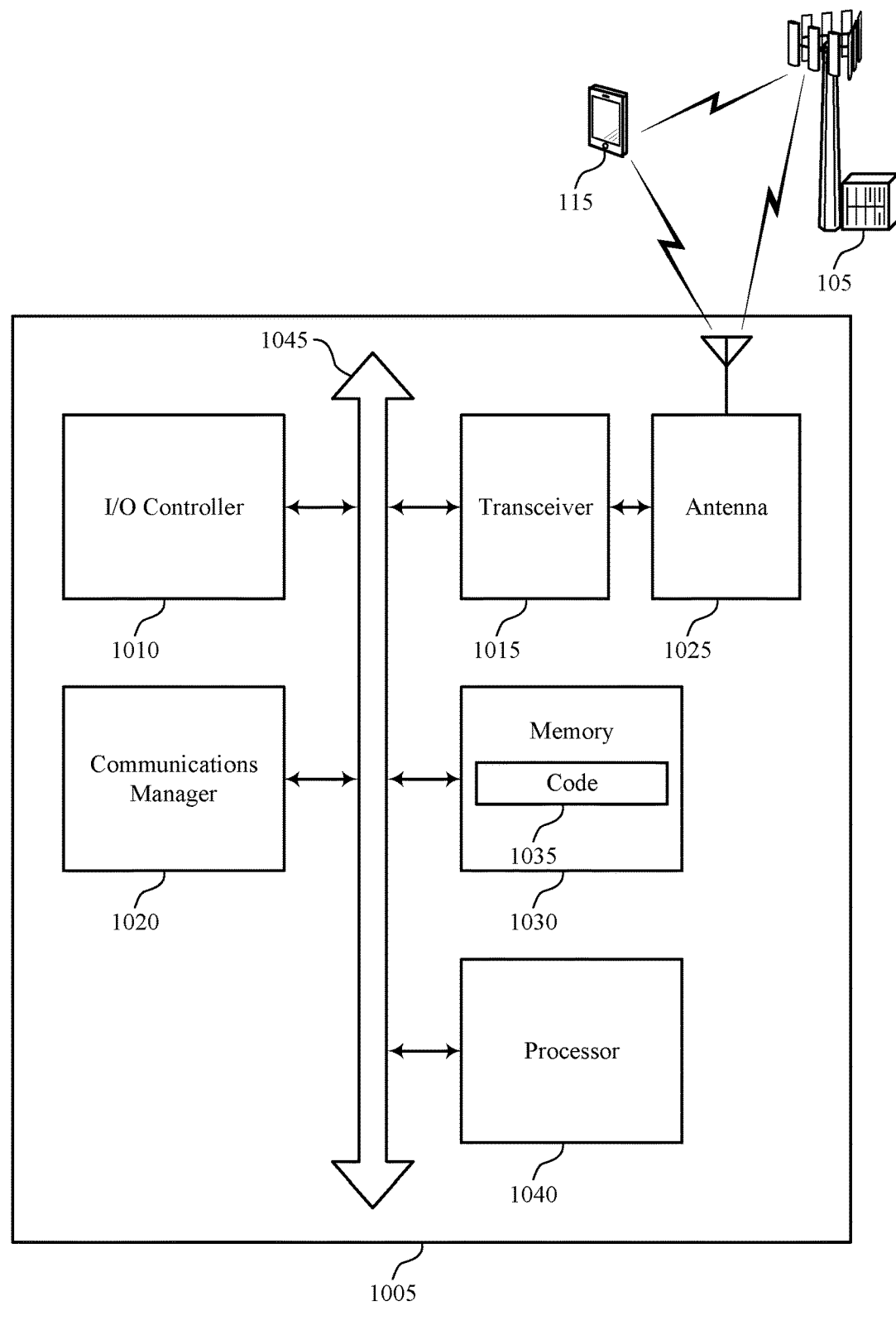
FIG. 10 shows a diagram of a system including a device that supports uplink PTRSs for multiple transmitters on uplink shared channels in accordance with one or more aspects of the present disclosure.

FIG. 10 shows a diagram of a system 1000 including a device 1005 that supports uplink PTRSs for multiple transmitters on uplink shared channels in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink PTRSs for multiple transmitters on uplink shared channels). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for transmitting capability signaling indicating a quantity of antenna ports for PTRSs supported by the UE. The communications manager 1020 may be configured as or otherwise support a means for receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The communications manager 1020 may be configured as or otherwise support a means for transmitting one or more PTRSs using the first set of antenna ports.

Additionally, or alternatively, the communications manager 1020 may support wireless communications at a user equipment in accordance with examples as disclosed herein. For example, the communications manager 1020 may be configured as or otherwise support a means for receiving control signaling indicating resource block associated with a DMRS antenna port, a type of DMRS configuration, an offset indicator, or any combination thereof. The communications manager 1020 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The communications manager 1020 may be configured as or otherwise support a means for transmitting one or more PTRSs in an RE of the RB according to the selected PTRS offset value.

Additionally, or alternatively, the communications manager 1020 may support wireless communications at a user equipment in accordance with examples as disclosed herein. For example, the communications manager 1020 may be configured as or otherwise support a means for receiving control signaling indicating resource block associated with a DMRS antenna port, a type of DMRS configuration, an offset indicator, or any combination thereof. The communications manager 1020 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The communications manager 1020 may be configured as or otherwise support a means for transmitting one or more PTRSs in an RE of the RB according to the selected PTRS offset value.

By including or configuring the communications manager 1020 in accordance with examples as described herein, the device 1005 may support techniques for PTRS antenna port configuration and use resulting in improved phase noise error detection and mitigation, improved reliability of communication, more efficient utilization of available system resources, decreased system latency, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of uplink PTRSs for multiple transmitters on uplink shared channels as described herein, or the processor 1040 and the memory 1030 may be otherwise configured to perform or support such operations.

Figure 11:
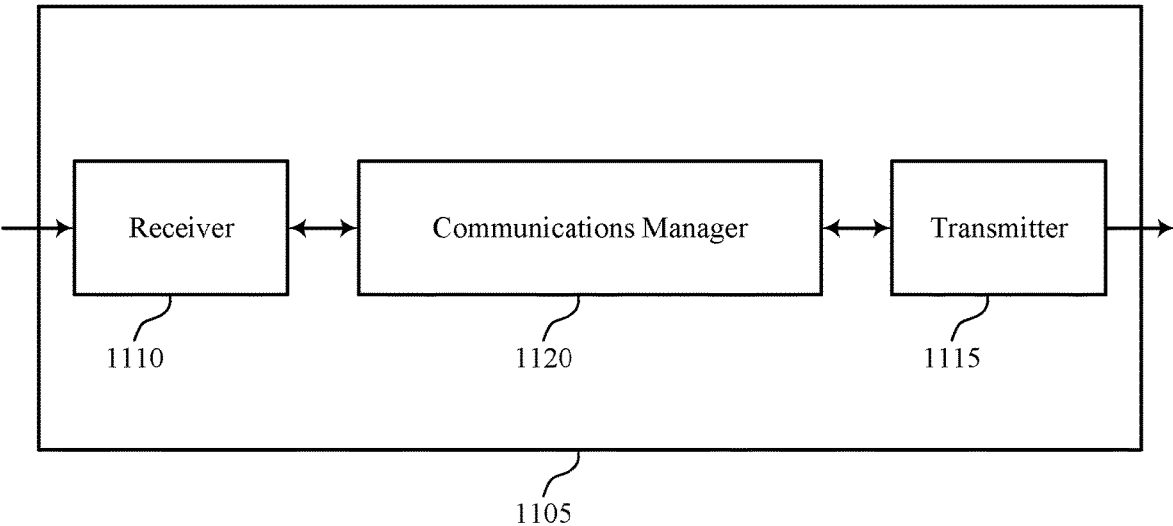
FIGS. 11 and 12 show block diagrams of devices that support uplink PTRSs for multiple transmitters on uplink shared channels in accordance with one or more aspects of the present disclosure.

FIG. 11 shows a block diagram 1100 of a device 1105 that supports uplink PTRSs for multiple transmitters on uplink shared channels in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of uplink PTRSs for multiple transmitters on uplink shared channels as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for receiving capability signaling indicating a quantity of antenna ports for PTRSs supported by a UE. The communications manager 1120 may be configured as or otherwise support a means for transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The communications manager 1120 may be configured as or otherwise support a means for receiving one or more PTRSs using the first set of antenna ports.

Additionally, or alternatively, the communications manager 1120 may support wireless communications at a network entity in accordance with examples as disclosed herein. For example, the communications manager 1120 may be configured as or otherwise support a means for transmitting control signaling indicating resource block associated with a DMRS antenna port, a type of DMRS configuration, an offset indicator, or any combination thereof. The communications manager 1120 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The communications manager 1120 may be configured as or otherwise support a means for receiving one or more PTRSs in an RE of the RB according to the selected PTRS offset value.

Additionally, or alternatively, the communications manager 1120 may support wireless communications at a network entity in accordance with examples as disclosed herein. For example, the communications manager 1120 may be configured as or otherwise support a means for transmitting control signaling indicating resource block associated with a DMRS antenna port, a type of DMRS configuration, an offset indicator, or any combination thereof. The communications manager 1120 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The communications manager 1120 may be configured as or otherwise support a means for receiving one or more PTRSs in an RE of the RB according to the selected PTRS offset value.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for PTRS antenna port configuration and use resulting in improved phase noise error detection and mitigation, improved reliability of communication, more efficient utilization of available system resources, and improved user experience.

Figure 12:
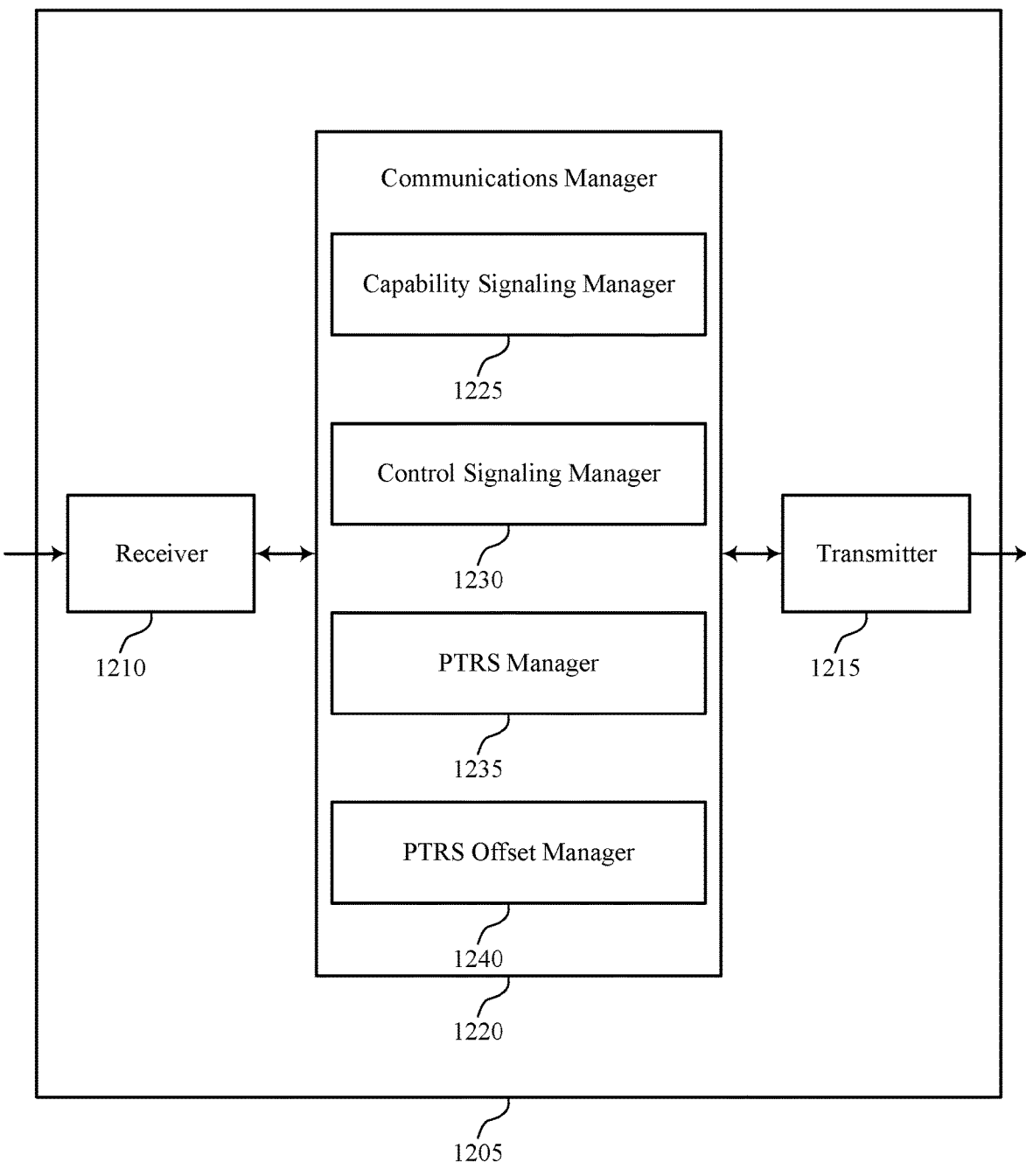

FIG. 12 shows a block diagram 1200 of a device 1205 that supports uplink PTRSs for multiple transmitters on uplink shared channels in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of uplink PTRSs for multiple transmitters on uplink shared channels as described herein. For example, the communications manager 1220 may include a capability signaling manager 1225, a control signaling manager 1230, an PTRS manager 1235, an PTRS offset manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The capability signaling manager 1225 may be configured as or otherwise support a means for receiving capability signaling indicating a quantity of antenna ports for PTRSs supported by a UE. The control signaling manager 1230 may be configured as or otherwise support a means for transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The PTRS manager 1235 may be configured as or otherwise support a means for receiving one or more PTRSs using the first set of antenna ports.

Additionally, or alternatively, the communications manager 1220 may support wireless communications at a network entity in accordance with examples as disclosed herein. The control signaling manager 1230 may be configured as or otherwise support a means for transmitting control signaling indicating resource block associated with a DMRS antenna port, a type of DMRS configuration, an offset indicator, or any combination thereof. The PTRS offset manager 1240 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The PTRS manager 1235 may be configured as or otherwise support a means for receiving one or more PTRSs in an RE of the RB according to the selected PTRS offset value.

Additionally, or alternatively, the communications manager 1220 may support wireless communications at a network entity in accordance with examples as disclosed herein. The control signaling manager 1230 may be configured as or otherwise support a means for transmitting control signaling indicating resource block associated with a DMRS antenna port, a type of DMRS configuration, an offset indicator, or any combination thereof. The PTRS offset manager 1240 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The PTRS manager 1235 may be configured as or otherwise support a means for receiving one or more PTRSs in an RE of the RB according to the selected PTRS offset value.

Figure 13:
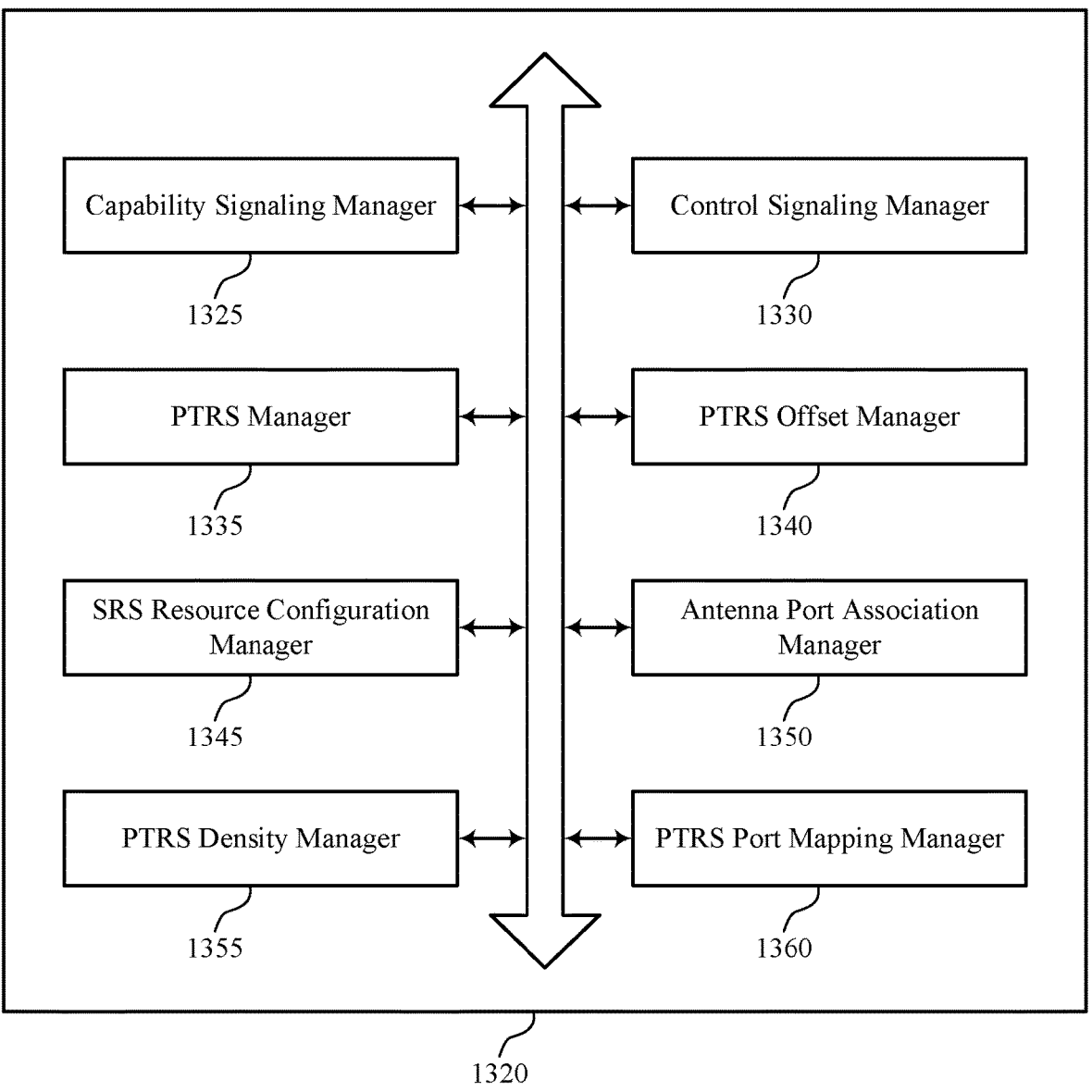
FIG. 13 shows a block diagram of a communications manager that supports uplink PTRSs for multiple transmitters on uplink shared channels in accordance with one or more aspects of the present disclosure.

FIG. 13 shows a block diagram 1300 of a communications manager 1320 that supports uplink PTRSs for multiple transmitters on uplink shared channels in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of uplink PTRSs for multiple transmitters on uplink shared channels as described herein. For example, the communications manager 1320 may include a capability signaling manager 1325, a control signaling manager 1330, an PTRS manager 1335, an PTRS offset manager 1340, an SRS resource configuration manager 1345, an antenna port association manager 1350, an PTRS density manager 1355, an PTRS antenna port mapping manager 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The capability signaling manager 1325 may be configured as or otherwise support a means for receiving capability signaling indicating a quantity of antenna ports for PTRSs supported by a UE. The control signaling manager 1330 may be configured as or otherwise support a means for transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The PTRS manager 1335 may be configured as or otherwise support a means for receiving one or more PTRSs using the first set of antenna ports.

In some examples, to support transmitting the control signaling, the SRS resource configuration manager 1345 may be configured as or otherwise support a means for transmitting RRC signaling indicating a set of multiple SRS resources, each SRS resource of the set of multiple SRS resources associated with one of the first set of antenna ports and one of the second set of antenna ports, where the second set of antenna ports includes a set of multiple SRS antenna ports.

In some examples, the PTRS antenna port mapping manager 1360 may be configured as or otherwise support a means for indicating, in the RRC signaling, a mapping between a first antenna port of the first set of antenna ports to a first SRS resource associated with a first antenna port of the second set of antenna ports and to a second SRS resource associated with the first antenna port of the second set of antenna ports according to the RRC signaling, where receiving the one or more PTRSs is based on the mapping.

In some examples, the quantity of antenna ports for PTRSs supported by the UE includes eight antenna ports, and a quantity of the set of multiple SRS resources includes eight SRS resources.

In some examples, the PTRSs are associated with non-codebook based transmissions on a physical uplink shared channel.

In some examples, to support transmitting the control signaling, the antenna port association manager 1350 may be configured as or otherwise support a means for transmitting a DCI message indicating that each antenna port of the first set of antenna ports is associated with two or more antenna ports of the second set of antenna ports according to a first ratio of a set of candidate ratios, where the second set of antenna ports includes a set of multiple DMRS antenna ports.

In some examples, the antenna port association manager 1350 may be configured as or otherwise support a means for indicating, in a four-bit field in the DCI message, a mapping of each antenna port of the first set of antenna ports to the two or more antenna ports of the second set of antenna ports.

In some examples, each antenna port of the first set of antenna ports is associated with two antenna ports of the second set of antenna ports, four antenna ports of the second set of antenna ports, or eight antenna ports of the second set of antenna ports, according to the first ratio.

In some examples, the antenna port association manager 1350 may be configured as or otherwise support a means for indicating, in a four-bit field in the DCI message, a mapping of each antenna port of the first set of antenna ports to the two or more antenna ports of the second set of antenna ports, where a first bit of the four-bit field indicates an association between a first antenna port of the first set of antenna ports and a first quantity of the second set of antenna ports and a second bit of the four-bit field indicates an association between a second antenna port of the first set of antenna ports and a second quantity of the second set of antenna ports that is different from the first quantity of the second set of antenna ports.

In some examples, the PTRSs are associated with non-codebook based transmissions on a physical uplink shared channel.

In some examples, the capability signaling manager 1325 may be configured as or otherwise support a means for receiving signaling indicating the quantity of antenna ports in the first set of antenna ports, the quantity of antenna ports in the first set of antenna ports being less than or equal to the quantity of antenna ports for PTRSs supported by the UE, where transmitting the control signaling is based on transmitting the signaling indicating the quantity of antenna ports in the first set of antenna ports.

In some examples, the capability signaling manager 1325 may be configured as or otherwise support a means for transmitting signaling indicating a mapping between each antenna port of the quantity of antenna ports in the first set of antenna ports and the one or more antenna ports of the second set of antenna ports, where receiving the control signaling is based on transmitting the signaling indicating the mapping, and where each antenna port of the first set of antenna ports corresponds to the one or more antenna ports of the second set of antenna ports according to the indicated mapping.

In some examples, to support receiving the PTRSs, the PTRS density manager 1355 may be configured as or otherwise support a means for receiving the PTRSs according to a time density value for phase tracking reference signaling of a set of multiple time density values associated with a modulation and coding scheme based on the quantity of antenna ports in the first set of antenna ports satisfying a threshold.

In some examples, to support receiving the PTRSs, the PTRS density manager 1355 may be configured as or otherwise support a means for receiving the PTRSs according to a frequency density value for phase tracking reference signaling of a set of multiple frequency density values associated with a modulation and coding scheme based on the quantity of antenna ports in the first set of antenna ports satisfying a threshold.

Additionally, or alternatively, the communications manager 1320 may support wireless communications at a network entity in accordance with examples as disclosed herein. In some examples, the control signaling manager 1330 may be configured as or otherwise support a means for transmitting control signaling indicating resource block associated with a DMRS antenna port, a type of DMRS configuration, an offset indicator, or any combination thereof. The PTRS offset manager 1340 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. In some examples, the PTRS manager 1335 may be configured as or otherwise support a means for receiving one or more PTRSs in an RE of the RB according to the selected PTRS offset value.

Additionally, or alternatively, the communications manager 1320 may support wireless communications at a network entity in accordance with examples as disclosed herein. In some examples, the control signaling manager 1330 may be configured as or otherwise support a means for transmitting control signaling indicating resource block associated with a DMRS antenna port, a type of DMRS configuration, an offset indicator, or any combination thereof. In some examples, the PTRS offset manager 1340 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. In some examples, the PTRS manager 1335 may be configured as or otherwise support a means for receiving one or more PTRSs in an RE of the RB according to the selected PTRS offset value.

Figure 14:
FIG. 14 shows a diagram of a system including a device that supports uplink PTRSs for multiple transmitters on uplink shared channels in accordance with one or more aspects of the present disclosure.

FIG. 14 shows a diagram of a system 1400 including a device 1405 that supports uplink PTRSs for multiple transmitters on uplink shared channels in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting uplink PTRSs for multiple transmitters on uplink shared channels). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for receiving capability signaling indicating a quantity of antenna ports for PTRSs supported by a UE. The communications manager 1420 may be configured as or otherwise support a means for transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The communications manager 1420 may be configured as or otherwise support a means for receiving one or more PTRSs using the first set of antenna ports.

Additionally, or alternatively, the communications manager 1420 may support wireless communications at a network entity in accordance with examples as disclosed herein. For example, the communications manager 1420 may be configured as or otherwise support a means for transmitting control signaling indicating resource block associated with a DMRS antenna port, a type of DMRS configuration, an offset indicator, or any combination thereof. The communications manager 1420 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The communications manager 1420 may be configured as or otherwise support a means for receiving one or more PTRSs in an RE of the RB according to the selected PTRS offset value.

Additionally, or alternatively, the communications manager 1420 may support wireless communications at a network entity in accordance with examples as disclosed herein. For example, the communications manager 1420 may be configured as or otherwise support a means for transmitting control signaling indicating resource block associated with a DMRS antenna port, a type of DMRS configuration, an offset indicator, or any combination thereof. The communications manager 1420 may be configured as or otherwise support a means for selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The communications manager 1420 may be configured as or otherwise support a means for receiving one or more PTRSs in an RE of the RB according to the selected PTRS offset value.

By including or configuring the communications manager 1420 in accordance with examples as described herein, the device 1405 may support techniques for PTRS antenna port configuration and use resulting in improved phase noise error detection and mitigation, improved reliability of communication, more efficient utilization of available system resources, decreased system latency, and improved user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of uplink PTRSs for multiple transmitters on uplink shared channels as described herein, or the processor 1435 and the memory 1425 may be otherwise configured to perform or support such operations.

FIG. 15 shows a flowchart illustrating a method 1500 that supports uplink PTRSs for multiple transmitters on uplink shared channels in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting capability signaling indicating a quantity of antenna ports for PTRSs supported by the UE. The operations of 1505 may be performed in accordance with examples as disclosed herein. In some examples, aspects of the operations of 1505 may be performed by a capability signaling manager 925 as described with reference to FIG. 9.

At 1510, the method may include receiving control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The operations of 1510 may be performed in accordance with examples as disclosed herein. In some examples, aspects of the operations of 1510 may be performed by a control signaling manager 930 as described with reference to FIG. 9.

At 1515, the method may include transmitting one or more PTRSs using the first set of antenna ports. The operations of 1515 may be performed in accordance with examples as disclosed herein. In some examples, aspects of the operations of 1515 may be performed by an PTRS manager 935 as described with reference to FIG. 9.

Figure 16:
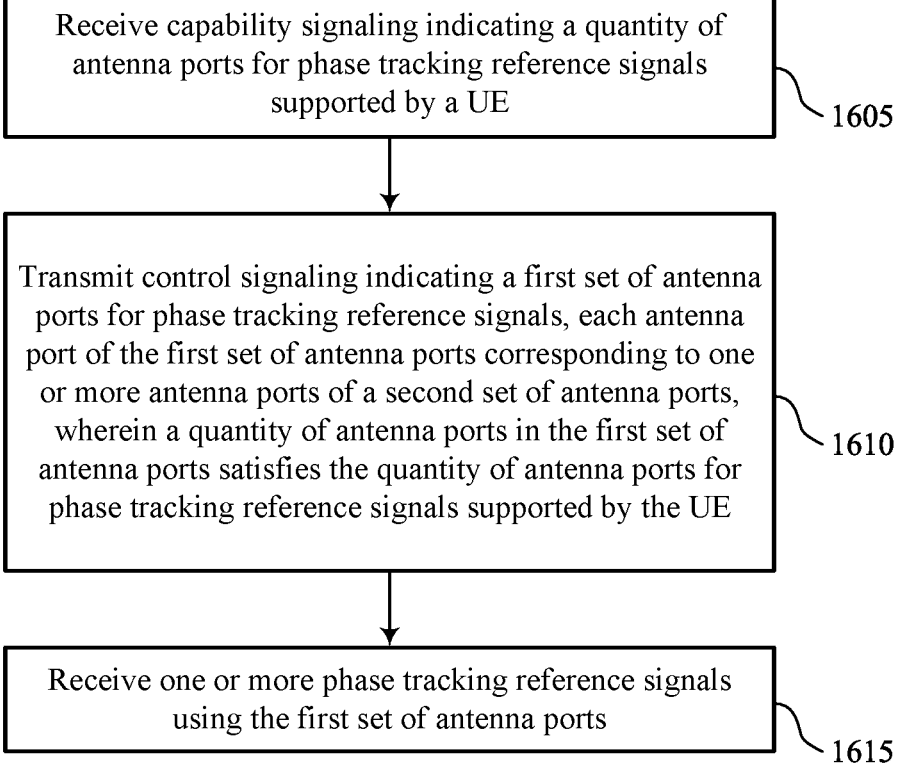

FIG. 16 shows a flowchart illustrating a method 1600 that supports uplink PTRSs for multiple transmitters on uplink shared channels in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include receiving capability signaling indicating a quantity of antenna ports for PTRSs supported by a UE. The operations of 1605 may be performed in accordance with examples as disclosed herein. In some examples, aspects of the operations of 1605 may be performed by a capability signaling manager 1325 as described with reference to FIG. 13.

At 1610, the method may include transmitting control signaling indicating a first set of antenna ports for PTRSs, each antenna port of the first set of antenna ports corresponding to one or more antenna ports of a second set of antenna ports, where a quantity of antenna ports in the first set of antenna ports satisfies the quantity of antenna ports for PTRSs supported by the UE. The operations of 1610 may be performed in accordance with examples as disclosed herein. In some examples, aspects of the operations of 1610 may be performed by a control signaling manager 1330 as described with reference to FIG. 13.

At 1615, the method may include receiving one or more PTRSs using the first set of antenna ports. The operations of 1615 may be performed in accordance with examples as disclosed herein. In some examples, aspects of the operations of 1615 may be performed by an PTRS manager 1335 as described with reference to FIG. 13.

FIG. 17 shows a flowchart illustrating a method 1700 that supports uplink PTRSs for multiple transmitters on uplink shared channels in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating resource block associated with a DMRS antenna port, a type of DMRS configuration, an offset indicator, or any combination thereof. The operations of 1705 may be performed in accordance with examples as disclosed herein. In some examples, aspects of the operations of 1705 may be performed by a control signaling manager 930 as described with reference to FIG. 9.

At 1710, the method may include selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The operations of 1710 may be performed in accordance with examples as disclosed herein. In some examples, aspects of the operations of 1710 may be performed by an PTRS offset manager 940 as described with reference to FIG. 9.

At 1715, the method may include transmitting one or more PTRSs in an RE of the RB according to the selected PTRS offset value. The operations of 1715 may be performed in accordance with examples as disclosed herein. In some examples, aspects of the operations of 1715 may be performed by an PTRS manager 935 as described with reference to FIG. 9.

FIG. 18 shows a flowchart illustrating a method 1800 that supports uplink PTRSs for multiple transmitters on uplink shared channels in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling indicating resource block associated with a DMRS antenna port, a type of DMRS configuration, an offset indicator, or any combination thereof. The operations of 1805 may be performed in accordance with examples as disclosed herein. In some examples, aspects of the operations of 1805 may be performed by a control signaling manager 1330 as described with reference to FIG. 13.

At 1810, the method may include selecting a PTRS offset value from a lookup table based on the control signaling, where each row of the lookup table is associated with a DMRS, and each column of the lookup table for a respective type of DMRS configuration is associated with an offset indicator, and where a set of entries in a first portion of each column of the lookup table is the same as a set of entries in a second portion of another column of the lookup table. The operations of 1810 may be performed in accordance with examples as disclosed herein. In some examples, aspects of the operations of 1810 may be performed by an PTRS offset manager 1340 as described with reference to FIG. 13.

At 1815, the method may include receiving one or more PTRSs in an RE of the RB according to the selected PTRS offset value. The operations of 1815 may be performed in accordance with examples as disclosed herein. In some examples, aspects of the operations of 1815 may be performed by an PTRS manager 1335 as described with reference to FIG. 13.

FIG. 19 shows a flowchart illustrating a method 1900 that supports uplink PTRSs for multiple transmitters on uplink shared channels in accordance with one or more aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include receiving control signaling indicating resource block associated with a DMRS antenna port, a type of DMRS configuration, an offset indicator, or any combination thereof. The operations of 1905 may be performed in accordance with examples as disclosed herein. In some examples, aspects of the operations of 1905 may be performed by a control signaling manager 930 as described with reference to FIG. 9.

At 1910, the method may include selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The operations of 1910 may be performed in accordance with examples as disclosed herein. In some examples, aspects of the operations of 1910 may be performed by an PTRS offset manager 940 as described with reference to FIG. 9.

At 1915, the method may include transmitting one or more PTRSs in an RE of the RB according to the selected PTRS offset value. The operations of 1915 may be performed in accordance with examples as disclosed herein. In some examples, aspects of the operations of 1915 may be performed by an PTRS manager 935 as described with reference to FIG. 9.

FIG. 20 shows a flowchart illustrating a method 2000 that supports uplink PTRSs for multiple transmitters on uplink shared channels in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting control signaling indicating resource block associated with a DMRS antenna port, a type of DMRS configuration, an offset indicator, or any combination thereof. The operations of 2005 may be performed in accordance with examples as disclosed herein. In some examples, aspects of the operations of 2005 may be performed by a control signaling manager 1330 as described with reference to FIG. 13.

At 2010, the method may include selecting a PTRS offset value from a lookup table based on the control signaling, where each row of the lookup table is associated with a DMRS, and each column of the lookup table for a respective type of DMRS configuration is associated with an offset indicator, and where for each row of the lookup table, a second entry is equal to a first entry incremented by a first value, and a third entry is equal to the second entry incremented by a second value that is different from the first value. The operations of 2010 may be performed in accordance with examples as disclosed herein. In some examples, aspects of the operations of 2010 may be performed by an PTRS offset manager 1340 as described with reference to FIG. 13.

At 2015, the method may include receiving one or more PTRSs in an RE of the RB according to the selected PTRS offset value. The operations of 2015 may be performed in accordance with examples as disclosed herein. In some examples, aspects of the operations of 2015 may be performed by an PTRS manager 1335 as described with reference to FIG. 13.

The following provides an overview of aspects of the present disclosure:

Aspect 1: A method for wireless communications at a UE, comprising: transmitting capability signaling indicating a quantity of antenna ports for PTRSs supported by the UE; receiving control signaling indicating a first set of antenna ports for PTRSs, each antenna port of the first set of antenna ports corresponding to one or more antenna ports of a second set of antenna ports, wherein a quantity of antenna ports in the first set of antenna ports satisfies the quantity of antenna ports for PTRSs supported by the UE; and transmitting one or more PTRSs using the first set of antenna ports.

Aspect 2: The method of aspect 1, wherein receiving the control signaling comprises: receiving RRC signaling indicating a plurality of SRS resources, each SRS resource of the plurality of SRS resources associated with one of the first set of antenna ports and one of the second set of antenna ports, wherein the second set of antenna ports comprises a plurality of SRS ports.

Aspect 3: The method of aspect 2, further comprising: mapping a first antenna port of the first set of antenna ports to a first SRS resource associated with a first antenna port of the second set of antenna ports and to a second SRS resource associated with the first antenna port of the second set of antenna ports according to the RRC signaling, wherein transmitting the one or more PTRSs is based at least in part on the mapping.

Aspect 4: The method of aspect 3, wherein the quantity of antenna ports for PTRSs supported by the UE comprises eight antenna ports, and a quantity of the plurality of SRS resources comprises eight SRS resources.

Aspect 5: The method of any of aspects 2 through 4, wherein the PTRSs are associated with non-codebook based transmissions on a physical uplink shared channel.

Aspect 6: The method of any of aspects 1 through 5, wherein receiving the control signaling comprises: receiving a DCI message indicating that each antenna port of the first set of antenna ports is associated with two or more antenna ports of the second set of antenna ports according to a first ratio of a set of candidate ratios, wherein the second set of antenna ports comprises a plurality of DMRS antenna ports.

Aspect 7: The method of aspect 6, further comprising: mapping each antenna port of the first set of antenna ports to the two or more antenna ports of the second set of antenna ports according to a four-bit field in the DCI message.

Aspect 8: The method of aspect 7, wherein each antenna port of the first set of antenna ports is associated with two antenna ports of the second set of antenna ports, four antenna ports of the second set of antenna ports, or eight antenna ports of the second set of antenna ports, according to the first ratio.

Aspect 9: The method of any of aspects 6 through 8, further comprising: mapping each antenna port of the first set of antenna ports to the two or more antenna ports of the second set of antenna ports according to a four-bit field in the DCI message, wherein a first bit of the four-bit field indicates an association between a first antenna port of the first set of antenna ports and a first quantity of the second set of antenna ports, and a second bit of the four-bit field indicates an association between a second antenna port of the first set of antenna ports and a second quantity of the second set of antenna ports that is different from the first quantity of the second set of antenna ports.

Aspect 10: The method of any of aspects 6 through 9, wherein the PTRSs are associated with non-codebook based transmissions on a physical uplink shared channel.

Aspect 11: The method of any of aspects 1 through 10, further comprising: transmitting signaling indicating the quantity of antenna ports in the first set of antenna ports, the quantity of antenna ports in the first set of antenna ports being less than or equal to the quantity of antenna ports for PTRSs supported by the UE, wherein receiving the control signaling is based at least in part on transmitting the signaling indicating the quantity of antenna ports in the first set of antenna ports.

Aspect 12: The method of aspect 11, further comprising: transmitting signaling indicating a mapping between each antenna port of the quantity of antenna ports in the first set of antenna ports and the one or more antenna ports of the second set of antenna ports, wherein receiving the control signaling is based at least in part on transmitting the signaling indicating the mapping, and wherein each antenna port of the first set of antenna ports corresponds to the one or more antenna ports of the second set of antenna ports according to the indicated mapping.

Aspect 13: The method of any of aspects 1 through 12, further comprising: selecting a time density value for phase tracking reference signaling from a plurality of time density values associated with a modulation and coding scheme based at least in part on the quantity of antenna ports in the first set of antenna ports satisfying a threshold, wherein transmitting the PTRSs is based at least in part on the selecting.

Aspect 14: The method of any of aspects 1 through 13, further comprising: selecting a frequency density value for phase tracking reference signaling from a plurality of frequency density values associated with a modulation and coding scheme based at least in part on the quantity of antenna ports in the first set of antenna ports satisfying a threshold, wherein transmitting the PTRSs is based at least in part on the selecting.

Aspect 15: A method for wireless communications at a network entity, comprising: receiving capability signaling indicating a quantity of antenna ports for PTRSs supported by a UE; transmitting control signaling indicating a first set of antenna ports for PTRSs, each antenna port of the first set of antenna ports corresponding to one or more antenna ports of a second set of antenna ports, wherein a quantity of antenna ports in the first set of antenna ports satisfies the quantity of antenna ports for PTRSs supported by the UE; and receiving one or more PTRSs using the first set of antenna ports.

Aspect 16: The method of aspect 15, wherein transmitting the control signaling comprises: transmitting RRC signaling indicating a plurality of SRS resources, each SRS resource of the plurality of SRS resources associated with one of the first set of antenna ports and one of the second set of antenna ports, wherein the second set of antenna ports comprises a plurality of SRS ports.

Aspect 17: The method of aspect 16, further comprising: indicating, in the RRC signaling, a mapping between a first antenna port of the first set of antenna ports to a first SRS resource associated with a first antenna port of the second set of antenna ports and to a second SRS resource associated with the first antenna port of the second set of antenna ports according to the RRC signaling, wherein receiving the one or more PTRSs is based at least in part on the mapping.

Aspect 18: The method of aspect 17, wherein the quantity of antenna ports for PTRSs supported by the UE comprises eight antenna ports, and a quantity of the plurality of SRS resources comprises eight SRS resources.

Aspect 19: The method of any of aspects 16 through 18, wherein the PTRSs are associated with non-codebook based transmissions on a physical uplink shared channel.

Aspect 20: The method of any of aspects 15 through 19, wherein transmitting the control signaling comprises: transmitting a DCI message indicating that each antenna port of the first set of antenna ports is associated with two or more antenna ports of the second set of antenna ports according to a first ratio of a set of candidate ratios, wherein the second set of antenna ports comprises a plurality of DMRS antenna ports.

Aspect 21: The method of aspect 20, further comprising: indicating, in a four-bit field in the DCI message, a mapping of each antenna port of the first set of antenna ports to the two or more antenna ports of the second set of antenna ports.

Aspect 22: The method of aspect 21, wherein each antenna port of the first set of antenna ports is associated with two antenna ports of the second set of antenna ports, four antenna ports of the second set of antenna ports, or eight antenna ports of the second set of antenna ports, according to the first ratio.

Aspect 23: The method of any of aspects 20 through 22, further comprising: indicating, in a four-bit field in the DCI message, a mapping of each antenna port of the first set of antenna ports to the two or more antenna ports of the second set of antenna ports, wherein a first bit of the four-bit field indicates an association between a first antenna port of the first set of antenna ports and a first quantity of the second set of antenna ports and a second bit of the four-bit field indicates an association between a second antenna port of the first set of antenna ports and a second quantity of the second set of antenna ports that is different from the first quantity of the second set of antenna ports.

Aspect 24: The method of any of aspects 20 through 23, wherein the PTRSs are associated with non-codebook based transmissions on a physical uplink shared channel.

Aspect 25: The method of any of aspects 15 through 24, further comprising: receiving signaling indicating the quantity of antenna ports in the first set of antenna ports, the quantity of antenna ports in the first set of antenna ports being less than or equal to the quantity of antenna ports for PTRSs supported by the UE, wherein transmitting the control signaling is based at least in part on transmitting the signaling indicating the quantity of antenna ports in the first set of antenna ports.

Aspect 26: The method of aspect 25, further comprising: transmitting signaling indicating a mapping between each antenna port of the quantity of antenna ports in the first set of antenna ports and the one or more antenna ports of the second set of antenna ports, wherein receiving the control signaling is based at least in part on transmitting the signaling indicating the mapping, and wherein each antenna port of the first set of antenna ports corresponds to the one or more antenna ports of the second set of antenna ports according to the indicated mapping.

Aspect 27: The method of any of aspects 15 through 26, wherein receiving the PTRSs comprises: receiving the PTRSs according to a time density value for phase tracking reference signaling of a plurality of time density values associated with a modulation and coding scheme based at least in part on the quantity of antenna ports in the first set of antenna ports satisfying a threshold.

Aspect 28: The method of any of aspects 15 through 27, wherein receiving the PTRSs comprises: receiving the PTRSs according to a frequency density value for phase tracking reference signaling of a plurality of frequency density values associated with a modulation and coding scheme based at least in part on the quantity of antenna ports in the first set of antenna ports satisfying a threshold.

Aspect 29: A method for wireless communications at a user equipment, comprising: receiving control signaling indicating resource block associated with a DMRS port, a type of DMRS configuration, an offset indicator, or any combination thereof; selecting a PTRS offset value from a lookup table based at least in part on the control signaling, wherein each row of the lookup table is associated with a DMRS, and each column of the lookup table for a respective type of DMRS configuration is associated with an offset indicator, and wherein a set of entries in a first portion of each column of the lookup table is the same as a set of entries in a second portion of another column of the lookup table; and transmitting one or more PTRSs in a resource element of the resource block according to the selected PTRS offset value.

Aspect 30: A method for wireless communications at a network entity, comprising: transmitting control signaling indicating resource block associated with a DMRS port, a type of DMRS configuration, an offset indicator, or any combination thereof; selecting a PTRS offset value from a lookup table based at least in part on the control signaling, wherein each row of the lookup table is associated with a DMRS, and each column of the lookup table for a respective type of DMRS configuration is associated with an offset indicator, and wherein a set of entries in a first portion of each column of the lookup table is the same as a set of entries in a second portion of another column of the lookup table; and receiving one or more PTRSs in a resource element of the resource block according to the selected PTRS offset value.

Aspect 31: A method for wireless communications at a user equipment, comprising: receiving control signaling indicating resource block associated with a DMRS port, a type of DMRS configuration, an offset indicator, or any combination thereof; selecting a PTRS offset value from a lookup table based at least in part on the control signaling, wherein each row of the lookup table is associated with a DMRS, and each column of the lookup table for a respective type of DMRS configuration is associated with an offset indicator, and wherein for each row of the lookup table, a second entry is equal to a first entry incremented by a first value, and a third entry is equal to the second entry incremented by a second value that is different from the first value; and transmitting one or more PTRSs in a resource element of the resource block according to the selected PTRS offset value.

Aspect 32: A method for wireless communications at a network entity, comprising: transmitting control signaling indicating resource block associated with a DMRS port, a type of DMRS configuration, an offset indicator, or any combination thereof; selecting a PTRS offset value from a lookup table based at least in part on the control signaling, wherein each row of the lookup table is associated with a DMRS, and each column of the lookup table for a respective type of DMRS configuration is associated with an offset indicator, and wherein for each row of the lookup table, a second entry is equal to a first entry incremented by a first value, and a third entry is equal to the second entry incremented by a second value that is different from the first value; and receiving one or more PTRSs in a resource element of the resource block according to the selected PTRS offset value.

Aspect 33: An apparatus for wireless communications at a UE, comprising a processor; memory coupled with the processor; and instructions stored in the memory and executable by the processor to cause the apparatus to perform a method of any of aspects 1 through 14.

Aspect 34: An apparatus for wireless communications at a UE, comprising at least one means for performing a method of any of aspects 1 through 14.

Aspect 35: A non-transitory computer-readable medium storing code for wireless communications at a UE, the code comprising instructions executable by a processor to perform a method of any of aspects 1 through 14.

Aspect 36: An apparatus for wireless communications at a network entity, comprising a processor; memory coupled with the processor; and instructions stored in the memory and executable by the processor to cause the apparatus to perform a method of any of aspects 15 through 28.

Aspect 37: An apparatus for wireless communications at a network entity, comprising at least one means for performing a method of any of aspects 15 through 28.

Aspect 38: A non-transitory computer-readable medium storing code for wireless communications at a network entity, the code comprising instructions executable by a processor to perform a method of any of aspects 15 through 28.

Aspect 39: An apparatus for wireless communications at a user equipment, comprising a processor; memory coupled with the processor; and instructions stored in the memory and executable by the processor to cause the apparatus to perform a method of any of aspects 29 through 29.

Aspect 40: An apparatus for wireless communications at a user equipment, comprising at least one means for performing a method of any of aspects 29 through 29.

Aspect 41: A non-transitory computer-readable medium storing code for wireless communications at a user equipment, the code comprising instructions executable by a processor to perform a method of any of aspects 29 through 29.

Aspect 42: An apparatus for wireless communications at a network entity, comprising a processor; memory coupled with the processor; and instructions stored in the memory and executable by the processor to cause the apparatus to perform a method of any of aspects 30 through 30.

Aspect 43: An apparatus for wireless communications at a network entity, comprising at least one means for performing a method of any of aspects 30 through 30.

Aspect 44: A non-transitory computer-readable medium storing code for wireless communications at a network entity, the code comprising instructions executable by a processor to perform a method of any of aspects 30 through 30.

Aspect 45: An apparatus for wireless communications at a user equipment, comprising a processor; memory coupled with the processor; and instructions stored in the memory and executable by the processor to cause the apparatus to perform a method of any of aspects 31 through 31.

Aspect 46: An apparatus for wireless communications at a user equipment, comprising at least one means for performing a method of any of aspects 31 through 31.

Aspect 47: A non-transitory computer-readable medium storing code for wireless communications at a user equipment, the code comprising instructions executable by a processor to perform a method of any of aspects 31 through 31.

Aspect 48: An apparatus for wireless communications at a network entity, comprising a processor; memory coupled with the processor; and instructions stored in the memory and executable by the processor to cause the apparatus to perform a method of any of aspects 32 through 32.

Aspect 49: An apparatus for wireless communications at a network entity, comprising at least one means for performing a method of any of aspects 32 through 32.

Aspect 50: A non-transitory computer-readable medium storing code for wireless communications at a network entity, the code comprising instructions executable by a processor to perform a method of any of aspects 32 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
transmitting capability signaling indicating a quantity of phase tracking reference signals (PTRS) ports supported by the UE, a requested quantity of PTRS ports that is less than or equal to the quantity of PTRS ports supported by the UE, and a mapping between each port of the requested quantity of PTRS ports and one or more ports of a second set of ports;
receiving, based at least in part on transmitting the capability signaling indicating the requested quantity of PTRS ports and the mapping, control signaling indicating a first set of ports for PTRS, each port of the first set of ports corresponding to the one or more ports of the second set of ports according to the mapping, wherein a quantity of ports in the first set of ports is the same as the requested quantity of PTRS ports; and
transmitting one or more PTRS using the first set of ports.
2. The method of claim 1, wherein receiving the control signaling comprises:
receiving radio resource control signaling indicating a plurality of sounding reference signal resources, each sounding reference signal resource of the plurality of sounding reference signal resources associated with one of the first set of ports and one of the second set of ports, wherein the second set of ports comprises a plurality of sounding reference signal ports.
3. The method of claim 2, further comprising:
mapping a first port of the first set of ports to a first sounding reference signal resource associated with a first port of the second set of ports and to a second sounding reference signal resource associated with the first port of the second set of ports according to the radio resource control signaling, wherein transmitting the one or more PTRS is based at least in part on the mapping.
4. The method of claim 3, wherein the quantity of PTRS ports supported by the UE comprises eight ports, and a quantity of the plurality of sounding reference signal resources comprises eight sounding reference signal resources.
5. The method of claim 2, wherein the PTRS are associated with non-codebook based transmissions on a physical uplink shared channel.
6. The method of claim 1, wherein receiving the control signaling comprises:
receiving a downlink control information message indicating that each port of the first set of ports is associated with two or more ports of the second set of ports according to a first ratio of a set of candidate ratios, wherein the second set of ports comprises a plurality of demodulation reference signal ports.
7. The method of claim 6, further comprising:
mapping each port of the first set of ports to the two or more ports of the second set of ports according to a four-bit field in the downlink control information message.
8. The method of claim 7, wherein each port of the first set of ports is associated with two ports of the second set of ports, four ports of the second set of ports, or eight ports of the second set of ports, according to the first ratio.

9. The method of claim 6, further comprising:

mapping each port of the first set of ports to the two or more ports of the second set of ports according to a four-bit field in the downlink control information message, wherein a first bit of the four-bit field indicates an association between a first port of the first set of ports and a first quantity of the second set of ports, and a second bit of the four-bit field indicates an association between a second port of the first set of ports and a second quantity of the second set of ports that is different from the first quantity of the second set of ports.

10. The method of claim 6, wherein the PTRS are associated with non-codebook based transmissions on a physical uplink shared channel.

11. The method of claim 1, further comprising:

selecting a time density value for phase tracking reference signaling from a plurality of time density values associated with a modulation and coding scheme based at least in part on the quantity of ports in the first set of ports satisfying a threshold, wherein transmitting the PTRS is based at least in part on the selecting.

12. The method of claim 1, further comprising:

selecting a frequency density value for phase tracking reference signaling from a plurality of frequency density values associated with a modulation and coding scheme based at least in part on the quantity of ports in the first set of ports satisfying a threshold, wherein transmitting the PTRS is based at least in part on the selecting.

13. A method for wireless communications at a network entity, comprising:

receiving capability signaling indicating a quantity of phase tracking reference signals (PTRS) ports supported by a user equipment (UE), a requested quantity of PTRS ports that is less than or equal to the quantity of PTRS ports supported by the UE, and a mapping between each port of the requested quantity of PTRS ports and one or more ports of a second set of ports;

transmitting, based at least in part on receiving the capability signaling indicating the requested quantity of PTRS ports and the mapping, control signaling indicating a first set of ports for PTRS, each port of the first set of ports corresponding to one or more ports of the second set of ports according to the mapping, wherein a quantity of ports in the first set of ports is the same as the requested quantity of PTRS ports; and receiving one or more PTRS using the first set of ports.

14. The method of claim 13, wherein transmitting the control signaling comprises:

transmitting radio resource control signaling indicating a plurality of sounding reference signal resources, each sounding reference signal resource of the plurality of sounding reference signal resources associated with one of the first set of ports and one of the second set of ports, wherein the second set of ports comprises a plurality of sounding reference signal ports.

15. The method of claim 14, further comprising:

indicating, in the radio resource control signaling, a mapping between a first port of the first set of ports to a first sounding reference signal resource associated with a first port of the second set of ports and to a second sounding reference signal resource associated with the first port of the second set of ports according to the radio resource control signaling, wherein receiving the one or more PTRS is based at least in part on the mapping.

16. The method of claim 15, wherein the quantity of PTRS ports supported by the UE comprises eight ports, and a quantity of the plurality of sounding reference signal resources comprises eight sounding reference signal resources.

17. The method of claim 14, wherein the PTRS are associated with non-codebook based transmissions on a physical uplink shared channel.

18. The method of claim 13, wherein transmitting the control signaling comprises:

transmitting a downlink control information message indicating that each port of the first set of ports is associated with two or more ports of the second set of ports according to a first ratio of a set of candidate ratios, wherein the second set of ports comprises a plurality of demodulation reference signal ports.

19. The method of claim 18, further comprising:

indicating, in a four-bit field in the downlink control information message, a mapping of each port of the first set of ports to the two or more ports of the second set of ports.

20. The method of claim 19, wherein each port of the first set of ports is associated with two ports of the second set of ports, four ports of the second set of ports, or eight ports of the second set of ports, according to the first ratio.

21. The method of claim 18, further comprising:

indicating, in a four-bit field in the downlink control information message, a mapping of each port of the first set of ports to the two or more ports of the second set of ports, wherein a first bit of the four-bit field indicates an association between a first port of the first set of ports and a first quantity of the second set of ports and a second bit of the four-bit field indicates an association between a second port of the first set of ports and a second quantity of the second set of ports that is different from the first quantity of the second set of ports.

22. The method of claim 18, wherein the PTRS are associated with non-codebook based transmissions on a physical uplink shared channel.

23. The method of claim 13, wherein receiving the PTRS comprises:

receiving the PTRS according to a time density value for phase tracking reference signaling of a plurality of time density values associated with a modulation and coding scheme based at least in part on the quantity of ports in the first set of ports satisfying a threshold.

24. The method of claim 13, wherein receiving the PTRS comprises:

receiving the PTRS according to a frequency density value for phase tracking reference signaling of a plurality of frequency density values associated with a modulation and coding scheme based at least in part on the quantity of ports in the first set of ports satisfying a threshold.

\* \* \* \* \*